(12) United States Patent
Schmaelzle et al.

(10) Patent No.: US 8,844,515 B2
(45) Date of Patent: Sep. 30, 2014

(54) CAROUSEL HELIOSTAT HAVING LOUVERED HORIZONTAL MIRRORS FOR SOLAR TOWER SYSTEMS

(75) Inventors: Philipp H. Schmaelzle, Los Altos, CA (US); Patrick Y. Maeda, Mountain View, CA (US); Patrick C. Cheung, Castro Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 380 days.

(21) Appl. No.: 13/215,177

(22) Filed: Aug. 22, 2011

(65) Prior Publication Data

US 2013/0047977 A1 Feb. 28, 2013

(51) Int. Cl.
 F24J 2/38 (2014.01)
 F24J 2/16 (2006.01)
 F24J 2/18 (2006.01)

(52) U.S. Cl.
 CPC ..... *F24J 2/38* (2013.01); *F24J 2/16* (2013.01); *F24J 2/18* (2013.01); *Y02E 10/47* (2013.01)
 USPC ............ 126/605; 126/600; 126/688; 126/573

(58) Field of Classification Search
 CPC .................. F24J 2/14; F24J 2/16; F24J 2/18; F24J 2/46; F24J 2/54; F24J 2/5431
 USPC ......... 126/571, 573, 574, 576, 578, 600, 604, 126/605, 688, 714; 60/641.11, 641.15; 359/853; 353/3
 See application file for complete search history.

(56) References Cited

U.S. PATENT DOCUMENTS

| 1,111,239 A | 9/1914 | Smelser |
| 2,712,772 A | 7/1955 | Trombe |
| (Continued) | | |

FOREIGN PATENT DOCUMENTS

| WO | 2010/033859 A2 | 3/2010 |
| WO | 2011/012545 A1 | 2/2011 |
| WO | 2011/148307 A2 | 12/2011 |

OTHER PUBLICATIONS

Dersch, Jürgen, et al. "Trough integration into power plants-a study on the performance and economy of integrated solar combined cycle systems", Energy, vol. 29, Issues 5-6, Apr.-May 2004, pp. 947-959.

(Continued)

*Primary Examiner* — Steven B McAllister
*Assistant Examiner* — Steven Anderson, II
(74) *Attorney, Agent, or Firm* — Bever, Hoffman & Harms, LLP; Patrick T. Bever

(57) ABSTRACT

A low profile heliostat with elongated louvered mirror segments is provided. Its envelope of revolution has the shape of a flat disc to enable heliostat fields with very high ground coverage ratio. The heliostat's disc-shaped footprint rotates around a substantially vertical axis (akin to a carousel). The short dimension of the mirror segments is drastically shorter than the disc's diameter. Embodiments are described in which the motion relies on two concentric rings, which are individually rotated around a vertical axis. The lower ring acts as a platform providing mainly azimuth tracking, carrying the upper ring. The differential rotation between the upper ring and the lower ring is translated into a rotation of the mirror segments around a second, perpendicular, axis and used for elevation tracking. Disc-shaped heliostat with D-shaped cut-offs are described, to facilitate the required maintenance access even in highly dense heliostat fields.

20 Claims, 15 Drawing Sheets

(56) References Cited

U.S. PATENT DOCUMENTS

| | | | |
|---|---|---|---|
| 3,861,379 A | | 1/1975 | Anderson, Jr. |
| 3,892,433 A | | 7/1975 | Blake |
| 3,905,352 A | | 9/1975 | Jahn |
| 3,924,604 A | * | 12/1975 | Anderson ............... 126/606 |
| 4,068,653 A | | 1/1978 | Bourdon et al. |
| 4,109,638 A | * | 8/1978 | Matlock et al. ............ 126/605 |
| 4,110,009 A | | 8/1978 | Bunch |
| 4,110,010 A | | 8/1978 | Hilton |
| 4,110,123 A | | 8/1978 | Goetzberger et al. |
| 4,117,682 A | | 10/1978 | Smith |
| 4,130,109 A | | 12/1978 | Brueck |
| 4,148,301 A | | 4/1979 | Cluff |
| 4,149,902 A | | 4/1979 | Mauer et al. |
| 4,153,813 A | | 5/1979 | Blieden et al. |
| 4,190,465 A | | 2/1980 | Boling |
| 4,193,819 A | | 3/1980 | Wohlmut |
| 4,218,114 A | * | 8/1980 | Bunch ...................... 359/853 |
| 4,261,335 A | | 4/1981 | Balhorn |
| 4,266,530 A | * | 5/1981 | Steadman ............... 126/602 |
| 4,935,631 A | | 6/1990 | Mosley et al. |
| 5,180,441 A | | 1/1993 | Cornwall et al. |
| 5,274,497 A | | 12/1993 | Casey |
| 5,530,418 A | | 6/1996 | Hsu et al. |
| 5,816,238 A | | 10/1998 | Burns et al. |
| 6,820,611 B2 | | 11/2004 | Kinoshita |
| 6,953,038 B1 | * | 10/2005 | Nohrig ...................... 126/694 |
| 7,192,146 B2 | | 3/2007 | Gross et al. |
| 7,677,241 B2 | | 3/2010 | Hickerson |
| 7,706,030 B2 | | 4/2010 | Herloski et al. |
| 8,354,628 B2 | | 1/2013 | Schmaelzle et al. |
| 2009/0038608 A1 | | 2/2009 | Caldwell |
| 2009/0126778 A1 | | 5/2009 | Brounne et al. |
| 2009/0205701 A1 | | 8/2009 | Govaerts et al. |
| 2009/0235974 A1 | | 9/2009 | Mapel et al. |
| 2010/0051016 A1 | | 3/2010 | Ammar |
| 2011/0079267 A1 | | 4/2011 | Raymond et al. |
| 2012/0031467 A1 | | 2/2012 | Schmaelzle et al. |
| 2012/0192917 A1 | * | 8/2012 | Whitted et al. ............... 136/246 |
| 2012/0325313 A1 | | 12/2012 | Cheung et al. |
| 2012/0325314 A1 | | 12/2012 | Cheung et al. |
| 2013/0047609 A1 | | 2/2013 | Schmaelzle et al. |

OTHER PUBLICATIONS

Jones, Dedger, et al. "Rotating Field Collector Subsystem Study and Evaluation", Sandia Contractor Report, 1982, 144 pages.

Kolb, Gregory J., et al. "Heliostat Cost Reduction Study", Sandia National Laboratory, Sandia Report SAND2007-3293, Jun. 2007, 159 pages.

Murphy, Thomas W., Jr. "Home photovoltaic systems for physicists", Physics Today, Jul. 2008, pp. 42-47.

Schramek, Philipp, et al. "Heliostats for maximum ground coverage", Energy 29 (2004), pp. 701-713.

Currie et al. "High-Efficiency Organic Solar Concentrators for Photovoltaics", Science 321 (2008), pp. 226-228.

Goetzberger et al. "Photovoltaic materials, history, status and outlook", Materials Science and Engineering R 40 (2003), pp. 1-46.

Meyer, Thomas J. J. "Photon Transport in Fluorescent Solar Collectors", Thesis for the degree of Doctor of Philosophy, School of Engineering Sciences, University of Southampton, Jul. 2009, 197 pgs.

Smestad et al. "The thermodynamic limits of light concentrators", Solar Energy Materials 21 (1990), pp. 99-111.

Weber et al. "Luminescent greenhouse collector for solar radiation", Applied Optics, vol. 15, No. 10, Oct. 1976, pp. 2299-2300.

* cited by examiner

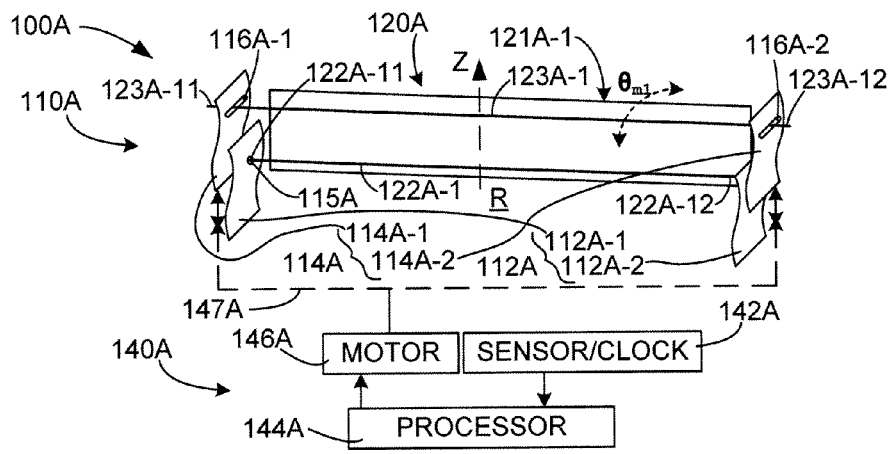
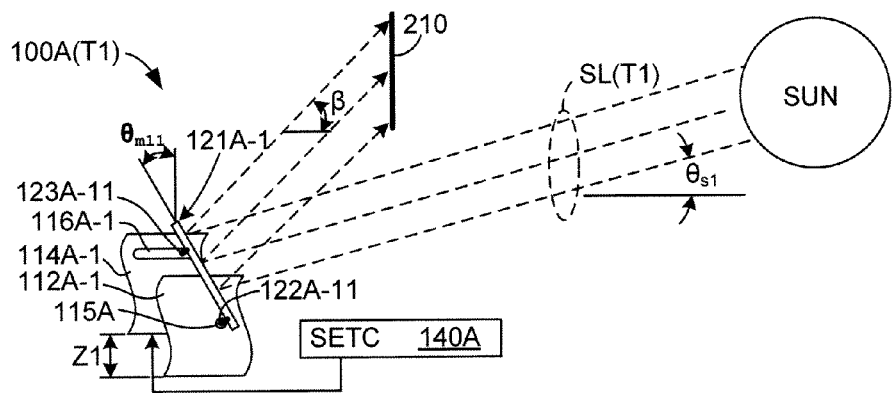
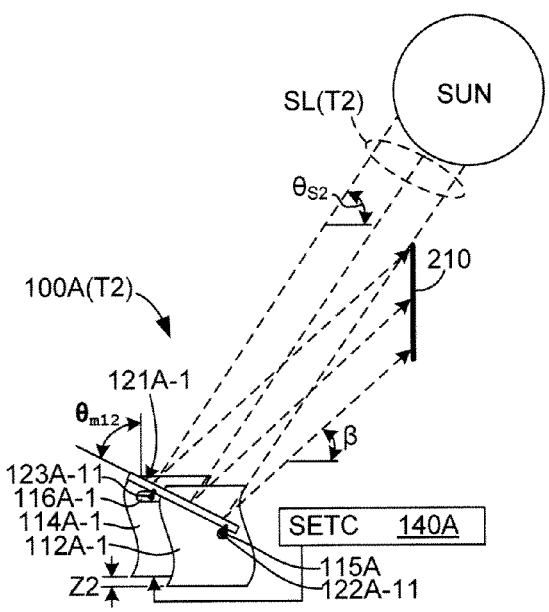

CAROUSEL HELIOSTAT HAVING LOUVERED HORIZONTAL MIRRORS FOR SOLAR TOWER SYSTEMS

FIELD OF THE INVENTION

The present invention relates generally to an improvement in solar-power generation, and more particularly to an improved heliostat for use in a solar tower system (solar tower power plant).

BACKGROUND OF THE INVENTION

State of the art "solar tower" type solar-thermal energy systems (power plants) use large numbers (e.g., one thousand, or often more) of heliostats to reflect sunlight onto a tower-mounted (raised) solar receiver for conversion to usable electricity. Each heliostat typically includes an array of flat (or in slightly concave) mirrors that are maintained in a substantially upright position on a support post. A total reflective surface area per heliostat of greater than 100 $m^2$ is not uncommon, yet there is a trend observable in recent plants towards smaller, less wind-affected, heliostats with individual mirror areas as small as 1 $m^2$. Each mirror in the array (heliostat field) is pivoted (rotated) in two axes to track the apparent angular movement of the sun such that exiting (reflected) sunlight is constantly directed from the mirrors onto the raised solar receiver during daylight hours. A prominent example of a conventional solar tower system is the PS20 plant near Seville, Spain, which is built by Abengoa Solar from the same sunny European country. PS20 produces 20 MW of electricity from collecting sunlight from 1,255 heliostats, with each heliostat having a flat mirror surface area of 1,291 square feet. Across the Atlantic, heliostat development effort in the U.S. was initiated in 1975. Since then, solar tower plant (system) designers determined that it would be more economical to build larger heliostats which in turn will service plants with larger power output. These plants are very promising as a renewable power source because the LCoE (Levelized Cost of Energy) is near 6 to 7¢/kWhr, which falls somewhere between the U.S. retail rates of 10/kWhr and generation cost from fossil fuel plants of 3¢/kWhr. Cost subtotal of heliostats makes up 50% of the total cost of a solar tower plant, and current technology has not observably brought the cost of heliostats down below 100\$/$m^2$, based on mirror surface area.

The solar tower industry has to overcome a number of technical challenges to bring future cost of heliostats to below \$100/$m^2$, at which point experts believe that the solar-tower technology will be competitive on the open market, especially if carbon-offset trading becomes the norm.

One impediment to reducing the cost of conventional heliostats is that the upright mirror arrangement experiences significant wind loading that must be accounted for by the mirror frame and support post. In windy conditions, the upright mirror arrangement effectively forms a large wind sail, and the resulting wind load forces are transmitted through the mirror support frame to the support post (which acts as a mast). Unless the support frame and support post structures are engineered to withstand worst case wind conditions, they risk damage or complete failure (collapse) under worst-case wind conditions. Thus, each heliostat's support frame and support post structures must either be extensively engineered, resulting in high design and production costs, or the heliostats will be subject to periodic wind-related damage, resulting in high repair and/or replacement costs.

Another problem facing conventional heliostats is that the upright mirror arrangement necessarily requires maintaining motors and/or complicated linkages at a significant distance above the ground in order to effect the necessary two-axis sun tracking operation. Periodic maintenance of the elevated location of the motors/linkages requires expensive lift equipment to enable access to the mirror array, and requires the maintenance personnel to work high above the ground and to move between the spaced-apart operational areas of the mirror array, thus increasing maintenance cost and chance of injury.

Another problem facing conventional upright mirror heliostats is that the heliostats must be positioned at a conservative offset spacing in order for all mirrors of conventional upright mirror arrangements to receive/reflect sunlight at most times during the year (i.e., in order to avoid shading/blocking of the mirrors). Depending on latitude and exact solar farm layout, a yearly aggregate of between approximately 30 and 80 percent more sunlight is available within the standard footprint of a standard upright mirror solar tower plant than is actually reflected by the heliostat mirrors. This "extra" (unreflected) sunlight is directed onto the bare ground between the heliostats that results from the conservative offset spacing, and the wasted "extra" sunlight is at a maximum when the noontime sun elevation angle is near its zenith (e.g., within one month of the summer solstice). Therefore, the ground coverage ratio (i.e., the ratio of reflected/captured sunlight to the total sunlight directed onto a given solar farm footprint) associated with conventional upright-mirror heliostats is necessarily small in a year-round aggregate, thus requiring a relatively large amount of land to produce a desired amount of solar power.

What is needed is an improved heliostat that addresses the cost, maintenance and ground coverage issues associated with conventional heliostats. What is also needed is a solar tower system that utilizes the improved heliostat in an efficient manner.

SUMMARY OF THE INVENTION

The present invention is directed to a carousel-type heliostat for reflecting sunlight onto a solar receiver in a solar tower system. The heliostat generally includes a carousel (i.e., a rotatable platform) that is used to rotate a mirror array around a fixed central axis, and a mirror positioning system that periodically adjusts a position of the mirror array during daylight hours such that sunlight is continuously reflected from the mirror array onto the solar receiver.

According to an aspect of the present invention, the mirror array includes multiple elongated flat mirrors that are movably disposed in a low-profile, substantially horizontal plane on the carousel such that each mirror is tiltable (e.g., rotatable around a horizontal axis) into a corresponding tilt position. Because the mirror array is maintained in a low-profile horizontal plane, the heliostat of the present invention avoids the wind-loading issues associated with conventional heliostats using upright mirror arrangements, thereby greatly reducing engineering constraints and corresponding production costs of the heliostat. That is, because the mirror array is maintained in a low-profile horizontal plane, the carousel avoids the significant windload forces experienced by upright mirror arrangements, and can therefore be manufactured using construction techniques that are much less expensive that those required for upright mirror arrangements. In addition, the horizontal arrangement of the mirror array reduces the shadowing issues of upright mirror arrangements, thereby facilitating a much higher ground coverage ratio (i.e., closer spacing between adjacent heliostats) than that achievable using conventional upright-mirror heliostats.

According to another aspect of the present invention, the carousel includes a peripheral edge structure that defines (surrounds) the carousel's footprint, and the mirror array is supported by and disposed inside the peripheral edge structure such that it can be rotated around the fixed central axis. For example, in one embodiment a peripheral wall rotates on the underlying support surface by way of a passive movable support (e.g., wheels), and opposing ends of each elongated flat mirror are connected to corresponding portions of the peripheral wall such that each elongated flat mirror is simply supported between the corresponding peripheral wall portions and extends across the central region. In this embodiment, all of elongated flat mirrors rotate with the peripheral wall. Alternatively, the peripheral wall is maintained in a stationary position on the support surface, and the opposing ends of each elongated flat mirror are connected to and supported between corresponding portions of the inner (moving) bearing of a roller bearing structure, where the outer race of the roller bearing structure is fixedly connected to and supported by the peripheral wall. Mounting the mirror array inside the peripheral wall in this manner further minimizes potential wind-loading forces by preventing wind from passing over the edges of the elongated flat mirrors, thereby preventing the mirrors from acting as "wings" to generate upward (lift) or downward forces on the carousel. In addition, mounting the mirror array such that all mirror support connections are located adjacent to the peripheral wall simplifies maintenance by allowing a maintenance person to access and service all of the mirror connections by standing in a single location and rotating the carousel.

According to yet another aspect of the present invention, the carousel further includes one or more tilt-angle control mechanisms that are disposed on or adjacent to the peripheral wall and are operably connected to the mirror array, and the mirror positioning system includes a solar elevation tracking controller that manipulates the tilt-angle control mechanism to adjust the corresponding tilt angle of each elongated flat mirror in accordance with a determined sun elevation angle, whereby sunlight is continuously reflected from the mirror array onto the solar receiver. Because the tilt-angle control mechanisms are located on the peripheral wall of the carousel, which is permanently maintained in the low-profile orientation (i.e., essentially at ground level), and because the mirror positioning system is located on the ground next to the carousel, maintenance of the heliostat is greatly simplified over that required for conventional heliostats using upright mirror arrangements (i.e., no special climbing equipment is needed, and a maintenance person can essentially stand in one place and rotate the carousel to access any connection that requires maintenance).

According to yet another aspect of the present invention, the mirror positioning system includes a solar azimuth tracking controller that adjusts the rotational position of the carousel around its central axis in accordance with a determined sun azimuth angle. Because the carousel is disposed to rotate in a circle and includes a peripheral wall, operation of the solar azimuth tracking controller in adjusting the rotational position of the carousel is simply achieved, for example, by applying a small radial force to the peripheral wall (or to a circular drive member fixedly connected to the peripheral wall) until the rotational position of the carousel is set such that sunlight directed onto the mirror array is reflected onto the solar receiver.

According to an embodiment of the present invention, each mirror of the mirror array is mounted on the carousel using a louver-type tilt mechanism that simultaneously rotates (tilts) and translates (laterally moves) each of the mirrors during adjustment for changes in the sun's elevation angle. In a specific embodiment, the louver-type tilt-mechanism includes a movable wall member that defines multiple slots and is moveable upward/downward relative to the peripheral wall, and each elongated flat mirror of the mirror array is rotatably connected to the peripheral wall by a first rod and slidably connected to the tilt-mechanism wall member by a second rod. Specifically, each end of the first rod is rotatably connected (e.g., by rotatable bearing structures) to corresponding opposing portions of the peripheral wall, and each end of the second rod is slidably engaged in a corresponding slot defined in opposing sections of the tilt-mechanism wall member. With this arrangement, movement of the movable member in an upward (first) direction relative to the peripheral wall, e.g., by way of a motor controlled in accordance with a determined sun elevation angle, causes the corresponding tilt angle of each elongated flat mirror to decrease, and movement of the movable member relative to the peripheral wall causes the corresponding tilt angle of each elongated flat mirror to increase. With several strip-like elongated mirrors attached to the carousel using this "louver" arrangement, the present invention is expected to enable a significantly higher ground coverage ratio. That is, when the mirrors turn (tilt), the mirrors not only 'rotate' but also 'translate' significant distances, reconfiguring the shadowing geometry favorably. As a result, a solar tower plant might achieve higher temperatures at the receiver for a given heliostat field size, or allow a smaller (easier to layout) heliostat field, providing the same receiver temperatures.

According to another embodiment of the present invention, the peripheral wall of the carousel is disposed on a passive movable support mechanism (e.g., wheels) that are disposed between the peripheral wall and the underlying support surface (e.g., ground). The wheels (or other movable support) facilitate the rotation of the carousel with low-resistance, thereby facilitating the use of a single motor in conjunction with the solar azimuth tracking controller to adjust the rotational position of the carousel around the central axis in accordance with a determined sun azimuth angle. In addition, the passive (i.e., non-powered) nature of the wheels minimizes the production and maintenance costs of the carousel. Moreover, by disposing the wheels below the peripheral wall, they are easily serviceable from perimeter of the carousel during maintenance. In one specific embodiment, a curved (e.g., circular) guide rail disposed on the ground below the peripheral wall, and the wheels are engaged with the curved guide such that the carousel is constrained to move along a circular or other curved path defined by the guide rail.

According to another embodiment of the present invention, the carousel includes a (first) curved/circular (e.g., ring or cylindrical) peripheral wall and a (second) curved/circular tilt-mechanism wall that is concentrically disposed and movably supported by the curved peripheral wall. By forming the curved peripheral wall and the curved tilt-mechanism wall with concentric circular shapes, the resulting substantially round shape of the carousel allows arranging multiple heliostats in a closely spaced relationship, thereby facilitating a much higher ground coverage ratio than that achievable using conventional upright-mirror heliostats. Moreover, the circular shape of the curved peripheral wall and the curved tilt-mechanism wall facilitates operating both structures from a single location because the curved/circular walls remain a substantially fixed distance from the mirror positioning system for all rotational positions of the carousel. Further, by combining this concentric arrangement with louvered mirrors (i.e., as described above), the resulting carousel facilitates simultaneous tilting of all elongated mirrors in the mirror array with one actuation.

According to another specific embodiment, a carousel is constructed such that the relative movement (i.e., upward or downward) of the tilt-mechanism wall relative to the peripheral wall to implement the louver-type mirror adjustment is generated by concentric rotation of the tilt-mechanism wall around the peripheral wall, and the mirror positioning system is constructed to perform independent rotation of tilt-mechanism wall and peripheral wall. In an exemplary specific embodiment, rollers are disposed on a cylindrical peripheral wall and ramp-like wedge structures are disposed on a ring-shaped tilt-mechanism wall, and the tilt-mechanism wall is concentrically mounted on the cylindrical peripheral wall such that the ramp-like wedge structures contact the rollers. Relative movement (i.e., upward or downward) of the tilt-mechanism wall to generate the louver-type mirror tilt operation mentioned above is performed by rotating the tilt-mechanism wall relative to the peripheral wall, causing the ramp-like wedge structures to ride on the rollers such that the tilt-mechanism wall is raised or lowered relative to the peripheral wall (i.e., depending on the direction of the relative rotation). This arrangement facilitates both carousel rotation and mirror tilt-angle control using two motors that respectively engage the tilt-mechanism wall and the peripheral wall by way of respective gear trains housed in a single motor box. Moreover, the circular carousel shape and single motor box arrangement facilitates arranging multiple heliostats in a closely spaced (e.g., square or hexagonal) relationship, thereby facilitating much higher ground coverage ratio than that achievable using conventional upright-mirror heliostats.

In accordance with yet another specific embodiment, a carousel includes a peripheral wall and a tilt-mechanism wall having concentric D-shaped (cut-off circular) structures, wherein each wall includes both a curved (e.g., semicircular) wall section and a straight (e.g., planar) end wall. The D-shaped carousel facilitates pathways for maintenance vehicles (e.g., by aligning the flat side walls of all heliostats disposed in an array), but at the cost of a small decrease in ground coverage ratio.

BRIEF DESCRIPTION OF THE DRAWINGS

These and other features, aspects and advantages of the present invention will become better understood with regard to the following description, appended claims, and accompanying drawings, where:

FIG. 2 is a partial rear side perspective view showing a portion of a carousel-type heliostat including a simplified louver-type mirror tilt-mechanism according to an exemplary embodiment of the present invention;

FIGS. 3(A) and 3(B) are side elevation views showing a mirror adjustment operation utilizing the louver-type tilt-mechanism of FIG. 2 according to an embodiment of the present invention;

DETAILED DESCRIPTION OF THE DRAWINGS

The present invention relates to an improved solar tower system. The following description is presented to enable one of ordinary skill in the art to make and use the invention as provided in the context of a particular application and its requirements. As used herein, directional terms such as "above", "upper", "upward", "below", "lower", "downward", "vertical", "horizontal", "front", and "rear", are intended to provide relative positions for purposes of description, and are not intended to designate an absolute frame of reference. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
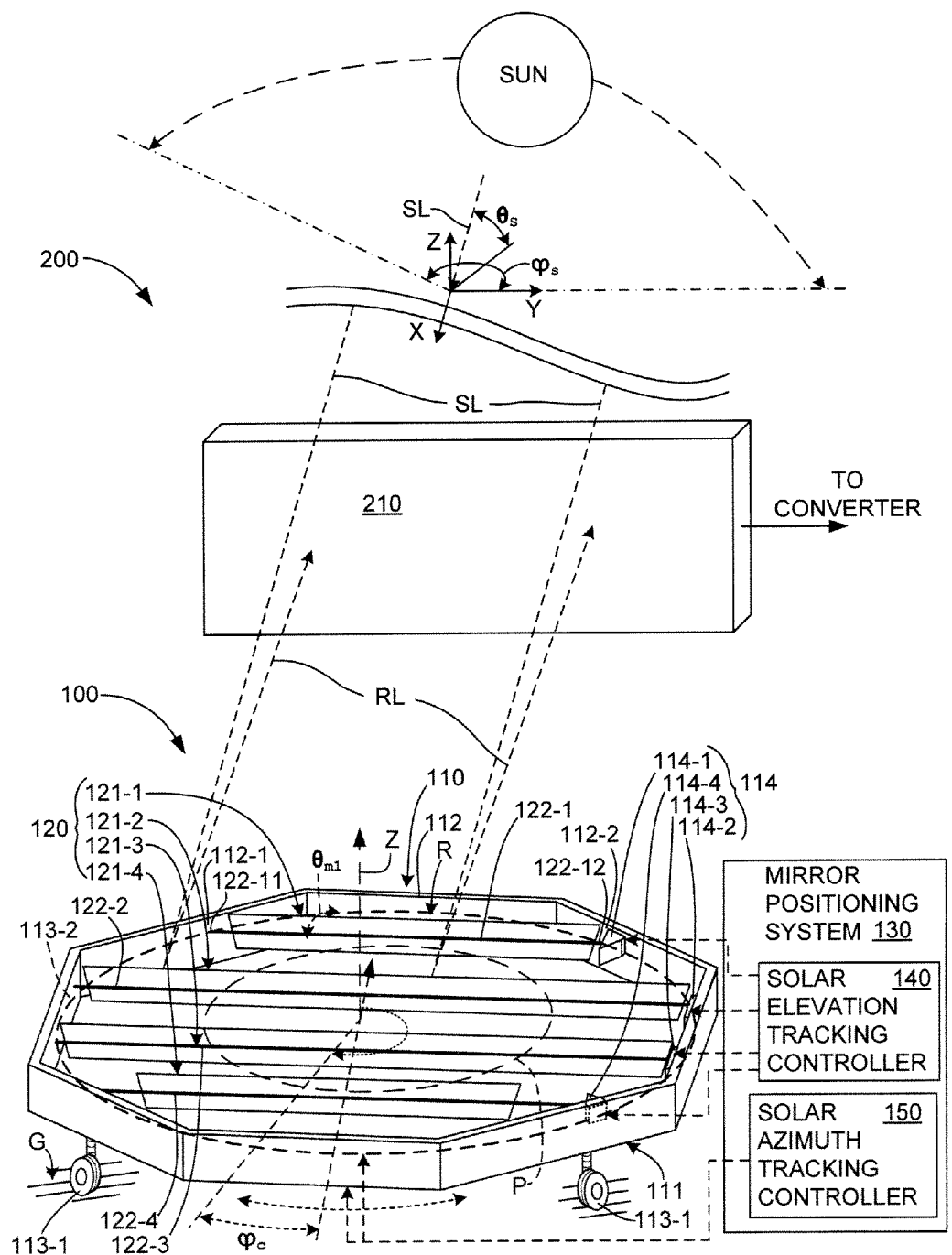
FIG. 1 is a top front perspective view showing a portion of a solar tower system including a carousel-type heliostat according to a simplified embodiment of the present invention.

FIG. 1 is a simplified perspective diagram showing a portion of a solar tower system 200 including a carousel-type heliostat 100 according to a simplified embodiment of the present invention. Similar to conventional solar-tower arrangements, system 200 includes a raised solar receiver 210 that is positioned to receive reflected sunlight RL from heliostat 100 (and many other similar heliostats, not shown, that are disposed around heliostat 100). Heliostat 100 generally includes a carousel (i.e., a rotatable platform) 110, which is rotatable around a fixed central axis Z relative to an underlying support surface (e.g., ground G), and a mirror positioning system 130 that is fixedly disposed on ground G next to (outside of) carousel 110. Carousel 110 generally serves the function of providing a substantially passive movable support for a mirror array 120, and mirror positioning system 130 serves the function of periodically adjusting rotational and tilt angle positions of mirror array 120 during daylight hours such that incident sunlight SL is continuously reflected from mirror array 120, and the reflected sunlight RL is continuously directed onto solar receiver 210. Details of the specific operations associated with these functions are described below.

Referring to the lower portion of FIG. 1, mirror array 120 includes multiple elongated (e.g., rectangular or trapezoidal) flat mirrors 121-1 to 121-4 that are disposed in a parallel arrangement on carousel 110 in a low-profile substantially horizontal plane P (i.e., such that mirror array 120 is contained within a vertical extent of approximately 1 meter or substantially less at all times). Each mirror (e.g., mirror 121-1) is separately movable (i.e., translatable and/or tiltable/rotatable) relative to carousel 110 into a corresponding tilt angle $\theta_{m1}$ that is determined and controlled by mirror positioning system 130. Embodiments describing exemplary connections and mechanisms associated with tilt angle adjustments of the mirrors are set forth below. Because the mirror array 120 is maintained in a low-profile horizontal plane P, heliostat 100 avoids the wind-loading issues associated with conventional upright-mirror heliostats, thereby greatly reducing engineering constraints and corresponding production costs of heliostat 100. That is, because mirror array 120 is arranged in a low-profile horizontal plane that is parallel to the wind direction, not perpendicular as experienced by upright-mirror heliostats, carousel 110 avoids the significant windload forces experienced by the conventional upright mirror arrangements, and can therefore be manufactured using construction techniques that are much less expensive that those required for upright mirror arrangements. In addition, the low-profile, horizontal arrangement of mirror array 120 essentially eliminates the shadowing issues of upright mirror arrangements (i.e., because horizontal flat structures cast little or no shadow under any lighting conditions). As such, heliostat 100 facilitates a much higher ground coverage ratio (i.e., closer spacing between adjacent heliostats) than is achievable using conventional upright-mirror heliostats.

According to an embodiment of the present invention, carousel 110 includes a base 111 having a peripheral wall (edge structure) 112 that entirely surrounds mirror array 120. In the illustrated embodiment, peripheral wall 112 includes substantially vertical walls that extend from a lower edge disposed on the support surface (or maintained a distance above the support surface) to an upper edge that is disposed at substantially the same height or above mirror array 120. Mounting mirror array 120 inside peripheral wall 112 in this manner further minimizes potential wind-loading forces by preventing wind from passing over the edges of elongated flat mirrors 121-1 to 121-4, thereby preventing an airfoil-type (wing-like) upward (lift) or downward force on carousel 110 when a prevailing wind is directed over the leading edge of one or more of mirrors 121-1 to 121-4. However, as described below with reference to FIGS. 13(A) and 13(B), benefits of the present invention may be achieved using a carousel base that omits a peripheral wall structure, although this would reduce the windload preventing benefits of a peripheral wall.

The peripheral edge structure (e.g., peripheral wall 112) of the present invention is not limited to the arrangements depicted by the exemplary embodiments described herein, so long as it adequately supports the outer edge of mirror array 120. That is, although peripheral wall 112 is depicted in FIG. 1 as including eight straight portions formed in an octagonal arrangement, the peripheral wall may be formed using circular and D-shaped closed-wall structures, such as those described below. Further, although circular and D-shaped peripheral wall arrangements are presently preferred for the reasons presented below, those skilled in the art will recognize that non-circular peripheral wall arrangements, such as the octagon indicated in FIG. 1, may be beneficially utilized, e.g., to simplify the construction process. As such, the present invention is not intended to be limited to the octagonal, circular or D-shaped peripheral wall arrangements unless otherwise specified in the claims.

According to another aspect of the present invention, elongated flat mirrors 121-1 to 121-4 are movably connected to peripheral wall 112 in a manner that allows mirror array 120 to rotate around central axis Z. In one embodiment, peripheral wall 112 is rotatable relative to ground G by way of wheels 113-1 or another passive movable support, and each elongated mirror 121-1 to 121-4 is simply supported between corresponding portions of peripheral wall 112, e.g., by way of rods 122-1 to 122-4. For example, as shown in FIG. 1, a back (non-reflective) surface of elongated mirror 121-1 is fixedly connected to rod 122-1, and mirror 121-1 is simply supported on peripheral wall 112 by way of connections between first end 122-11 of rod 122-1 and peripheral wall portion 112-1, and between second end 122-12 of rod 122-1 and peripheral wall portion 112-2. Mirrors 121-2, 121-3 and 121-4 are similarly simply supported by way of rods 122-1, 122-2 and 122-3, respectively. Mounting the mirror array 120 such that all mirror support connections are located adjacent to peripheral wall 112 simplifies maintenance of carousel 110 by allowing a maintenance person to service all of the mirror connections while standing in a single location next to peripheral wall 112 (i.e., the maintenance person can access any mirror support connection needing service simply by rotating carousel 110 until the mirror support connection is at his/her location). Further, no special climbing equipment is needed to service the mirrors because all of the connections are located at essentially ground level.

According to yet another aspect of the present invention, carousel 110 further includes one or more tilt-angle control mechanisms 114 that are disposed adjacent to the peripheral wall 112 and operably connected to mirror array 120. As described below, tilt-angle control mechanism 114 operates in conjunction with mirror positioning system 130 to adjust the corresponding tilt angle of elongated flat mirrors 121-1 to 121-4. In one embodiment, tilt-angle control mechanism 114 includes a single passive structure that is mounted on peripheral wall 112 and operably connected to both mirror array 120 and mirror positioning system 130 such that a mechanical force supplied by mirror positioning system 130 is transferred to mirror array 120, thereby simultaneously adjusting all of mirrors 121-1 to 121-4 into a desired tilt angle (e.g., rotating mirror 121-1 around rod 122 into a desired tilt angle $\theta_{m1}$). Alternatively, tilt-angle control mechanism 114 includes multiple active mechanisms 114-1 to 114-4 (e.g., motors) and associated linkages that are mounted on peripheral wall 112 and are respectively operably connected to mirrors 121-1 to 121-4. In this embodiment, active mechanisms 114-1 to 114-4 receive control signals from mirror positioning system 130, and generate appropriate rotational forces that adjust mirrors 121-1 to 121-4 into the desired tilt angle (e.g., by rotating rod 122-1 to adjust mirror 121-1 into desired tilt angle $\theta_{m1}$). Because tilt-angle control mechanism 114 is mounted on or otherwise located adjacent to peripheral wall 112, which is permanently maintained in the low-profile orientation (i.e., essentially at ground level), and because mirror positioning system 130 is located on ground G next to carousel 110, maintenance of the tilt-angle functions of heliostat 100 is greatly simplified over that required for conventional heliostats using upright mirror arrangements (i.e., no special climbing equipment is needed, and a maintenance person can essentially stand in one place and rotate the carousel 110 to access any connection that requires maintenance).

Referring to the lower right portion of FIG. 1, the mirror positioning system 130 includes a solar elevation tracking controller 140 that manipulates tilt-angle control mechanism 114 to adjust the corresponding tilt angle of each elongated flat mirror 121-1 to 121-4 in accordance with a determined sun elevation angle $\theta_s$, and solar azimuth tracking controller 150 that adjusts the rotational position $\phi_c$ of carousel 110 around its central axis Z in accordance with a determined sun azimuth angle $\phi_s$, whereby sunlight SL is continuously reflected from the mirror array 120 onto the solar receiver 210.

In accordance with an aspect of the present invention, solar elevation tracking controller 140 includes various operational components (e.g., sun position sensors, processor/control signal generators, and motors) that generate and transmit associated control forces/signals that cause tilt-angle control mechanism 114 to adjust the corresponding tilt angle of each elongated flat mirror (e.g., tilt angle $\theta_{m1}$ of mirror 121-1) in accordance with a determined sun elevation angle $\theta_s$. Because solar elevation tracking controller 140 is disposed on the ground adjacent to carousel 110 and tilt-angle control mechanism 114 is disposed adjacent to peripheral wall 112, transmission of the associated control forces/signals from solar elevation tracking controller 140 to tilt-angle control mechanism 114 is greatly simplified, and maintenance of solar elevation tracking controller 140 and all associated connections is easily performed from a single ground-level location.

Similarly, solar azimuth tracking controller 150 includes various operational components (e.g., sun position sensors, processor/control signal generators, and motors) that generate and transmit associated control forces that cause rotation of mirror array 120 around central axis Z to adjust the rotational position $\phi_c$ of mirror array 120 relative to the determined sun azimuth angle $\phi_s$. Because carousel 110 is disposed to rotate mirror array 120 in a circle and because the outer perimeter of mirror array is essentially disposed on peripheral wall 112, operation of the solar azimuth tracking controller 150 in adjusting the rotational position $\phi_c$ of the carousel 110 is simply achieved, for example, by applying a small radial force to peripheral wall 112 (or to a circular drive member connected to peripheral wall 112). Moreover, maintenance of solar azimuth tracking controller 150 and all associated connections is easily performed from a single ground-level location.

Additional features and alternative embodiments will now be described with reference to several alternative embodiments.

FIG. 2 is a partial top side perspective view showing a heliostat 100A according to a first alternative embodiment of the present invention in which each mirror is attached to a carousel 110A by way of a simplified louver-type tilt mechanism 114A that simultaneously rotates (tilts) and translates (laterally moves) each of the mirrors during adjustment for changes in the sun's elevation angle. Carousel 110A includes a peripheral wall 112A that defines a central region (footprint) R, and a mirror array 120A including a plurality of elongated mirrors that rotate around a central axis Z. Note that, for explanatory purposes, only small portions 112A-1 and 112A-2 of peripheral wall 112A and one mirror 121A-1 are shown in FIG. 2, but that the structure and arrangement of peripheral wall 112A and mirror array 120A are otherwise similar to those of the generalized embodiment shown in FIG. 1.

Referring to the lower portion of FIG. 2, solar elevation tracking controller 140A includes a device (e.g., one or more sensors or a clock and geo-position data table circuit) 142A for detecting or otherwise determining the sun's elevation angle at a given moment, a processor 144A for generating control signals in response to the detected elevation angle, and a motor 146A that is operably coupled by an associated linkage mechanism to transmit a lifting force (indicated by arrow 147A) to louver-type tilt mechanism 114A in response to the control signals generated by processor 144A. Those skilled in the art will recognize that the simplified component description of specific solar elevation tracking controller 140A shown in FIG. 2 is merely exemplary, and that several alternative arrangements may be utilized to achieve the louver operations described herein.

In accordance with an aspect of the present embodiment, simplified louver-type tilt-mechanism 114A includes movable members 114A-1 and 114A-2 that are movably disposed adjacent to peripheral wall portions 112A-1 and 112A-2, respectively, and that define slots 116A-1 and 116A-2, respectively. As indicated by the two-headed arrows at the lower end of members 114A-1 and 114A-2, louver-type tilt-mechanism 114A is moveable in the Z-axis direction (i.e., upward and downward) relative to the peripheral wall 112A in accordance with a force 147A generated by motor 146A.

In accordance with another aspect of the present embodiment, mirror 121A-1 is rotatably connected to peripheral wall 112A by a first rod 122A-1, and is slidably connected to tilt-mechanism 114A by a second rod 123A-1. Specifically, opposing ends 122A-11 and 122A-12 of rod 122A-1 are respectively rotatably connected (e.g., by rotatable bearing structure 115A) to corresponding opposing peripheral wall portions 112A-1 and 112A-2, and opposing ends 123A-11 and 123A-12 of rod 123A-1 are respectively slidably engaged in slots 116A-1 and 116A-2. With this arrangement, mirror 121A-1 is constrained to rotate (pivot) around rod 122A-1 when tilt-mechanism 114A is moved upward or downward relative to peripheral wall 112A during a mirror tilt operation. In addition, as mirror 121A-1 rotates (pivots) around rod 122A-1, the upward or downward movement of tilt-mechanism 114A causes opposing ends 123A-11 and 123A-12 of rod 123A-1 to slide along slots 116A-1 and 116A-2, respectively, thereby causing mirror 121A-1 to tilt.

FIGS. 3(A) and 3(B) are partial side elevation views showing heliostat 100A during a mirror adjustment operation utilizing louver-type tilt-mechanism described above with reference to FIG. 2. These simplified figures show a portion of heliostat 100A including peripheral wall portion 112A-1, tilt-mechanism movable member 114A-1, and mirror 121A-1 during the mirror adjustment operation.

FIG. 3(A) shows heliostat 100A(T1) (i.e., heliostat 100A at dawn or in the evening) when the sun's elevation angle $\theta s1$ is relatively shallow due to the sun's low position on the horizon. To compensate for the detected sun elevation angle $\theta s1$, solar elevation tracking controller (SETC) 140A applies a control force to movable member 114A-1 such that movable member 114A-1 assumes a (first) raised position relative to peripheral wall portion 112A-1 (indicated by arrow Z1) in accordance with a detected sun elevation angle $\theta s1$. The raised position of movable member 114A-1 positions rod end 123A-11 at the front (right) end of slot 116A-1, which causes mirror 121A-1 to rotate (pivot) around rod end 122A-11 (which is held by bearing 115A) into a relatively upright tilt angle $\theta m11$, whereby mirror 121A-1 is properly positioned to reflect sunlight rays SL(T1) at a predetermined reflection angle $\beta$ onto raised solar receiver 210.

FIG. 3(B) shows heliostat 100A(T2) (i.e., heliostat 100A during midday hours) after the sun's elevation angle $\theta s2$ has increased to a maximum elevation. To track the elevation angle change from angle $\theta s1$ (see FIG. 3(A)) to angle $\theta s2$, solar elevation tracking controller 140A continuously or periodically generates control signals that cause mirror 121A-1 to gradually tilt backward into pivot angle θm12 in order to continuously reflect sunlight rays SL(T2) at predetermined reflection angle β onto raised solar receiver 210. In particular, solar elevation tracking controller (SETC) 140A applies a continuous series of control forces to movable member 114A-1 such that movable member 114A-1 gradually moves downward from the raised position relative to peripheral wall portion 112A-1 (indicated by arrow Z1 in FIG. 3(A)) to the lowered position indicated by arrow Z2 in FIG. 3(B) in accordance with the changing sun elevation angle. The gradual decline of movable member 114A-1 causes rod end 123A-11 to slide from the front (right) end of slot 116A-1 toward the rear (left) end of slot 116A-1, which causes mirror 121A-1 to rotate (pivot) in a counterclockwise direction around rod end 122A-11/bearing 115A into the relatively flat tilt angle θm12, whereby mirror 121A-1 is properly positioned to reflect sunlight rays SL(T2) at a predetermined reflection angle β onto raised solar receiver 210.

Subsequently, during the afternoon hours as the sun's elevation angle again decreases, the solar elevation tracking controller generates control signals that cause mirror 121A-1 to tilt downward toward pivot angle $\theta_{m11}$. With several strip-like elongated mirrors attached to the carousel 110A using this "louver" arrangement, the present invention is expected to enable a significantly higher ground coverage ratio. That is, when the mirrors turn (tilt), the mirrors not only 'rotate' but also 'translate' significant distances, reconfiguring the shadowing geometry favorably. As a result, a solar tower plant might achieve higher temperatures at the receiver for a given heliostat field size, or allow a smaller (easier to layout) heliostat field, providing the same receiver temperatures.

Figure 4:
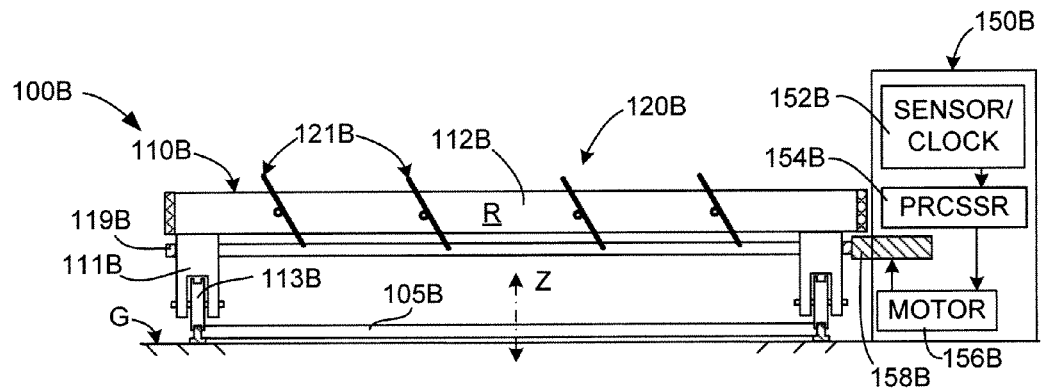
FIG. 4 is a simplified side elevation view showing a roundabout-type carousel utilized in accordance with an embodiment of the present invention.

FIG. 4 is a simplified side elevation view showing a simplified heliostat 100B including a roundabout-type carousel 110B and an associated solar azimuth tracking controller 150B in accordance with another embodiment of the present invention. Carousel 110B includes a peripheral wall 112B that defines a central region R, and a mirror array 120B including elongated flat mirrors 121B that movably secured to peripheral wall 112B. Note that the structure and arrangement of peripheral wall 112B and mirror array 120B may be implemented using any of the mechanisms described herein.

In accordance with the present embodiment, peripheral wall 112B is disposed by way of a base structure 111B on a passive movable support mechanism (e.g., wheels) 113B that are disposed between the peripheral wall 112B and curved guide (rails) 105B. Base structure 111B is constructed in a manner similar to well-known roundabout platform arrangements utilized, for example, in the railroad industry, and is movably supported by wheels 113B, which are engaged with curved guide 105B (e.g., a circular or semicircular rail or track whose center coincides with axis Z), which in turn is fixedly attached to an underlying support surface (e.g., ground G). This arrangement constrains carousel 110B to rotate around centrally located axis Z.

In the exemplary embodiment shown in FIG. 4, solar azimuth tracking controller 150B includes a device (e.g., a sensor or a clock and sun position table circuit) 152B for detecting or otherwise determining the sun's azimuth angle at a given moment, a processor 154B for generating generate control signals in accordance with the output of sensor 152B, and motor 156B that is operably connected by way of a drive wheel/gear 158B to a drive ring/rail 119B that is fixedly connected to peripheral wall 112B such that motor 156B causes carousel 110B to rotate on circular track 105B around axis Z (shown in end view) in accordance with the control signals generated by processor 154B. Those skilled in the art will recognize that the specific base structure arrangement shown in FIG. 4 is merely exemplary, and that several alternative arrangements may be utilized to achieve functions of constraining a carousel to rotate as described herein.

Figure 5A:
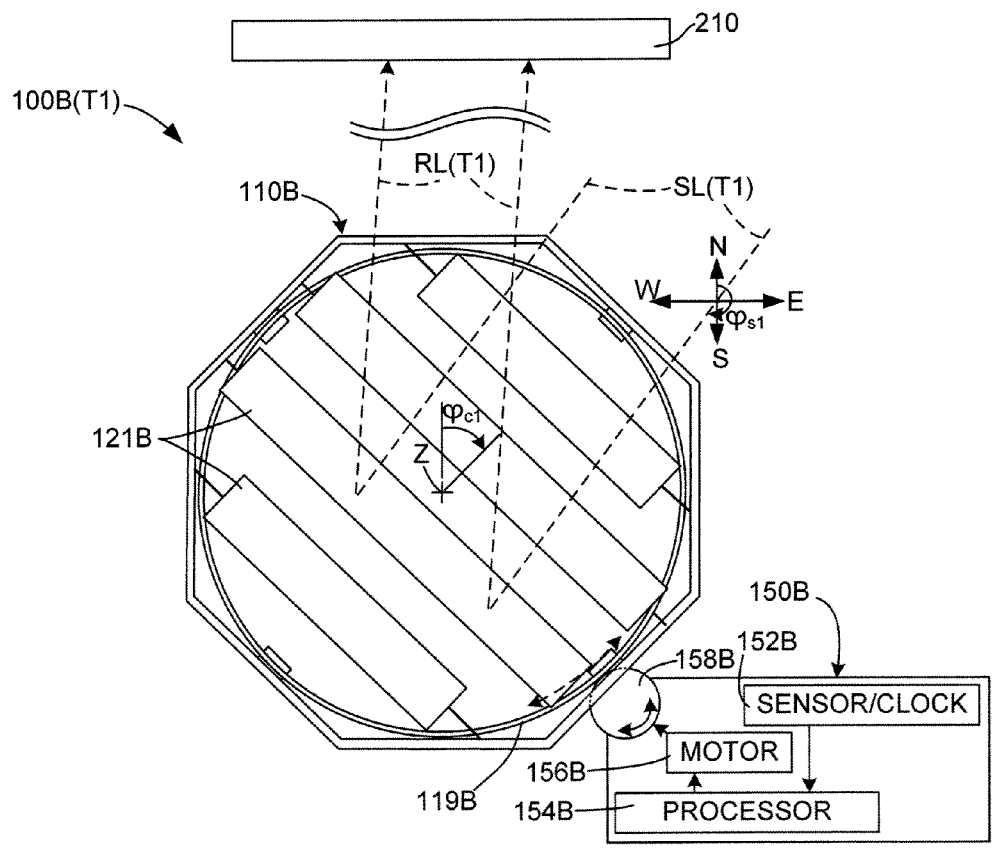
FIGS. 5(A) and 5(B) are top plan views showing rotation of the roundabout-type carousel of FIG. 4 using an exemplary solar azimuth tracking controller according to another embodiment of the present invention.
Figure 5B:
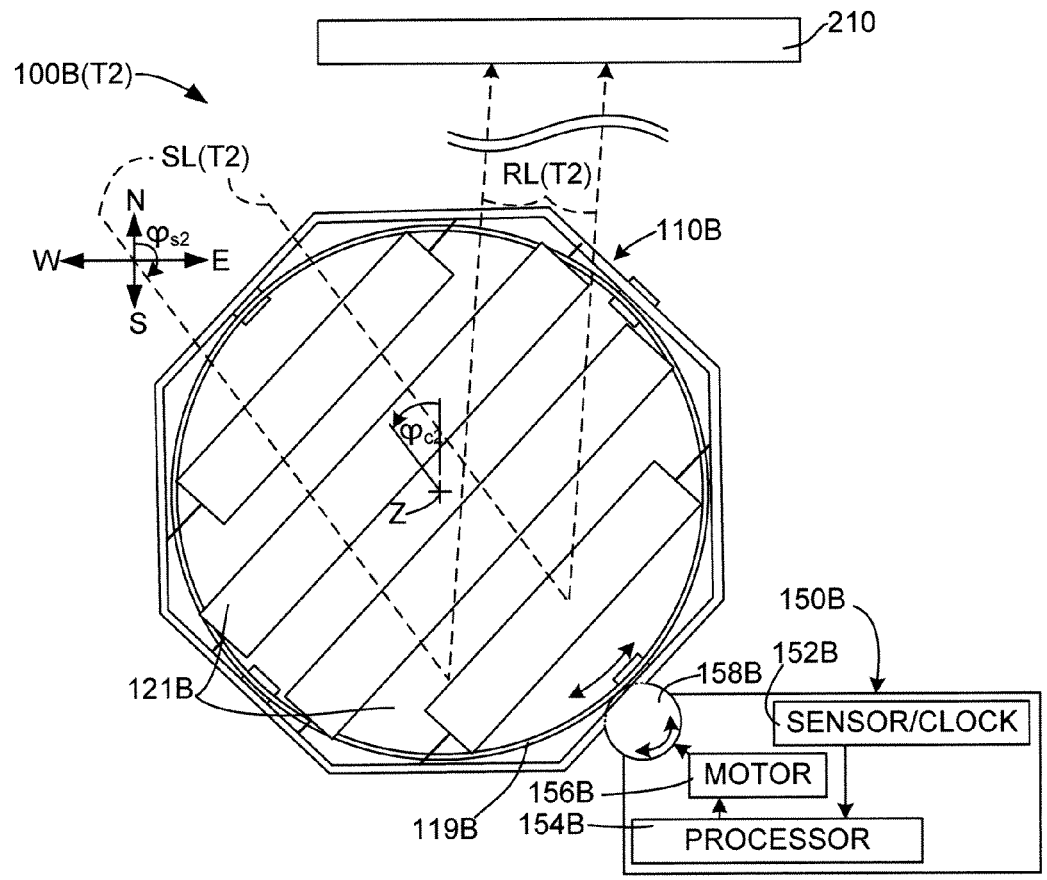

FIGS. 5(A) and 5(B) are simplified top views showing a portion of system 100B during morning and evening time periods, respectively. FIG. 5(A) shows system 100B(T1) (i.e., system 100B at a time T1, e.g., at sunrise) when the sun is positioned such that the azimuth angle $\phi_{s1}$ of sunlight rays SL(T1) are directed in a generally northeast-to-southwest direction. At this time, solar azimuth tracking controller 150B has caused carousel 110B to rotate around axis Z into rotational position $\phi_{c1}$ such that each mirror 121B faces northeast toward the rising sun, and in particular such that reflected sunlight rays RL(T1) are directed by mirrors 121B onto receiver 210. During the day, as the sun's relative position changes from northeast to northwest, solar azimuth tracking controller 150B causes carousel 110B to rotate accordingly such that sunlight is continuously reflected toward receiver 210. FIG. 5(B) shows system 100B(T2) (i.e., system 100B at a time T2, e.g., in the evening) when the sun is positioned such that the azimuth angle $\phi_{s2}$ of sunlight rays SL(T2) is directed in a generally northwest-to-southeast direction, and solar azimuth tracking controller 150B positions carousel 110B such that mirrors 121B face northwest toward the setting sun with reflected sunlight rays RL(T2) directed onto receiver 210.

By providing carousel 110B with a suitable low-resistance movable support (e.g., wheels 113B, shown in FIG. 4), the present embodiment facilitates rotation of carousel 110B around central axis Z using a simple, low cost azimuth tracking controller that requires minimal energy, and facilitates the use of a single low-energy motor (i.e., motor 156B) to adjust rotational position $\phi_c$ of carousel 110B around central axis Z in accordance with a detected sun azimuth angle $\phi_s$, thereby facilitating much higher energy output than is possible using conventional heliostat arrangements while maintaining low system costs. In addition, the passive (i.e., non-powered) nature of wheels 113B minimizes the production and maintenance costs of carousel 110B. Moreover, by disposing wheels 113B below peripheral wall 112B (as shown in FIG. 4), they are easily serviceable from perimeter of the carousel during maintenance. Those skilled in the art will recognize that solar azimuth tracking controller 150B is merely exemplary, and that several alternative arrangements may be utilized to achieve functions of that solar azimuth tracking controllers described herein.

Figure 6A:
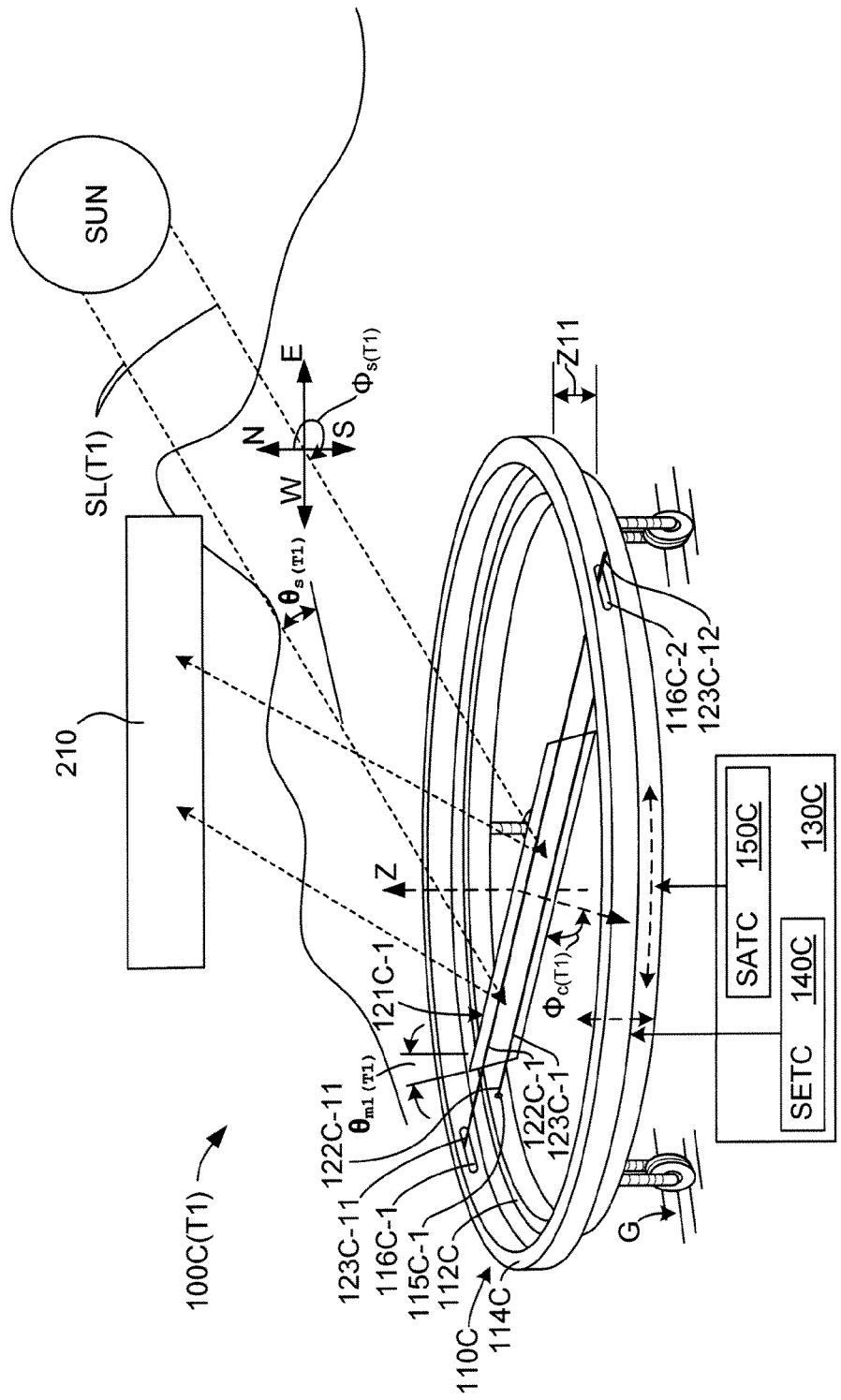
FIGS. 6(A), 6(B) and 6(C) are simplified top side perspective views showing a concentric ring-type carousel according to a simplified embodiment of the present invention.
Figure 6B:
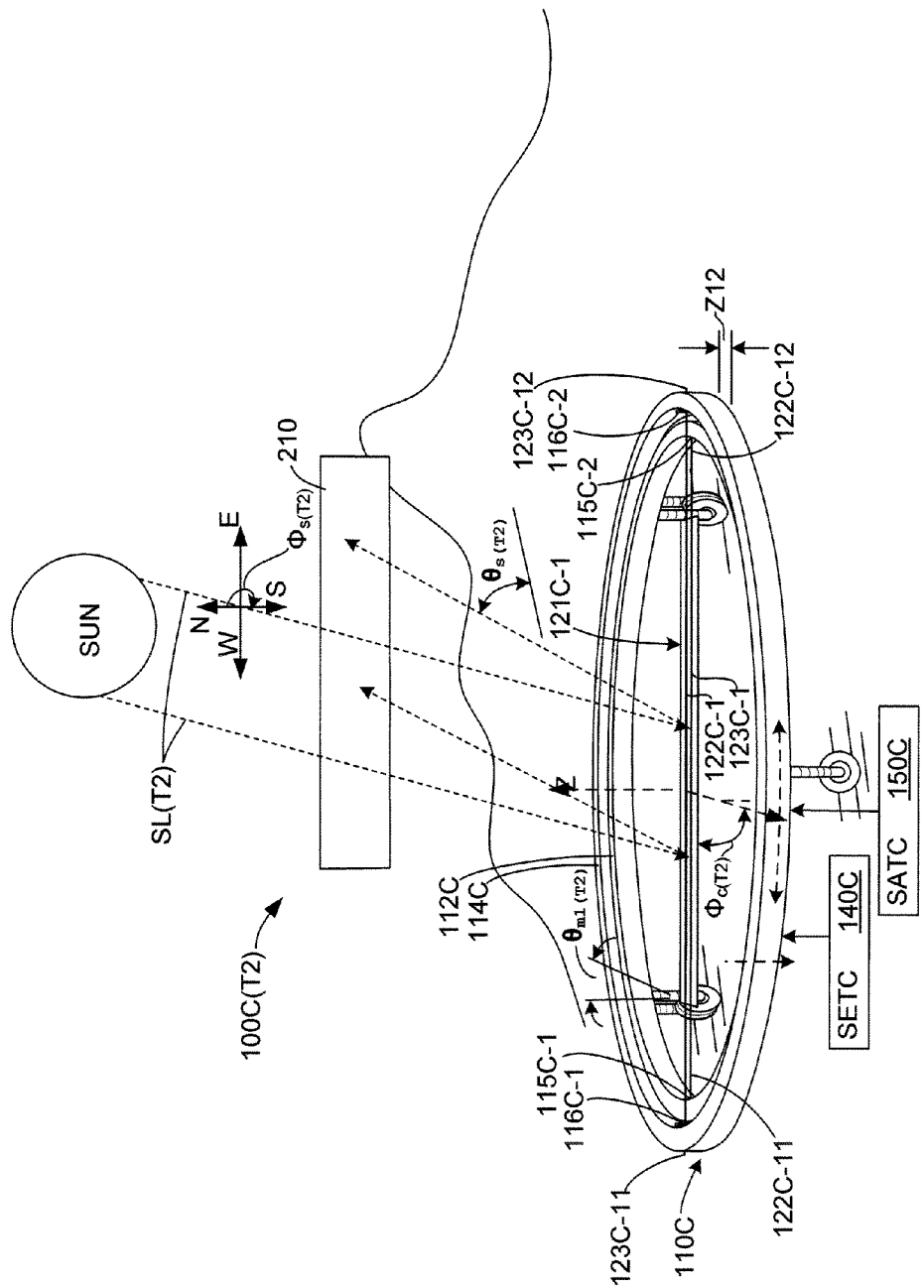
Figure 6C:
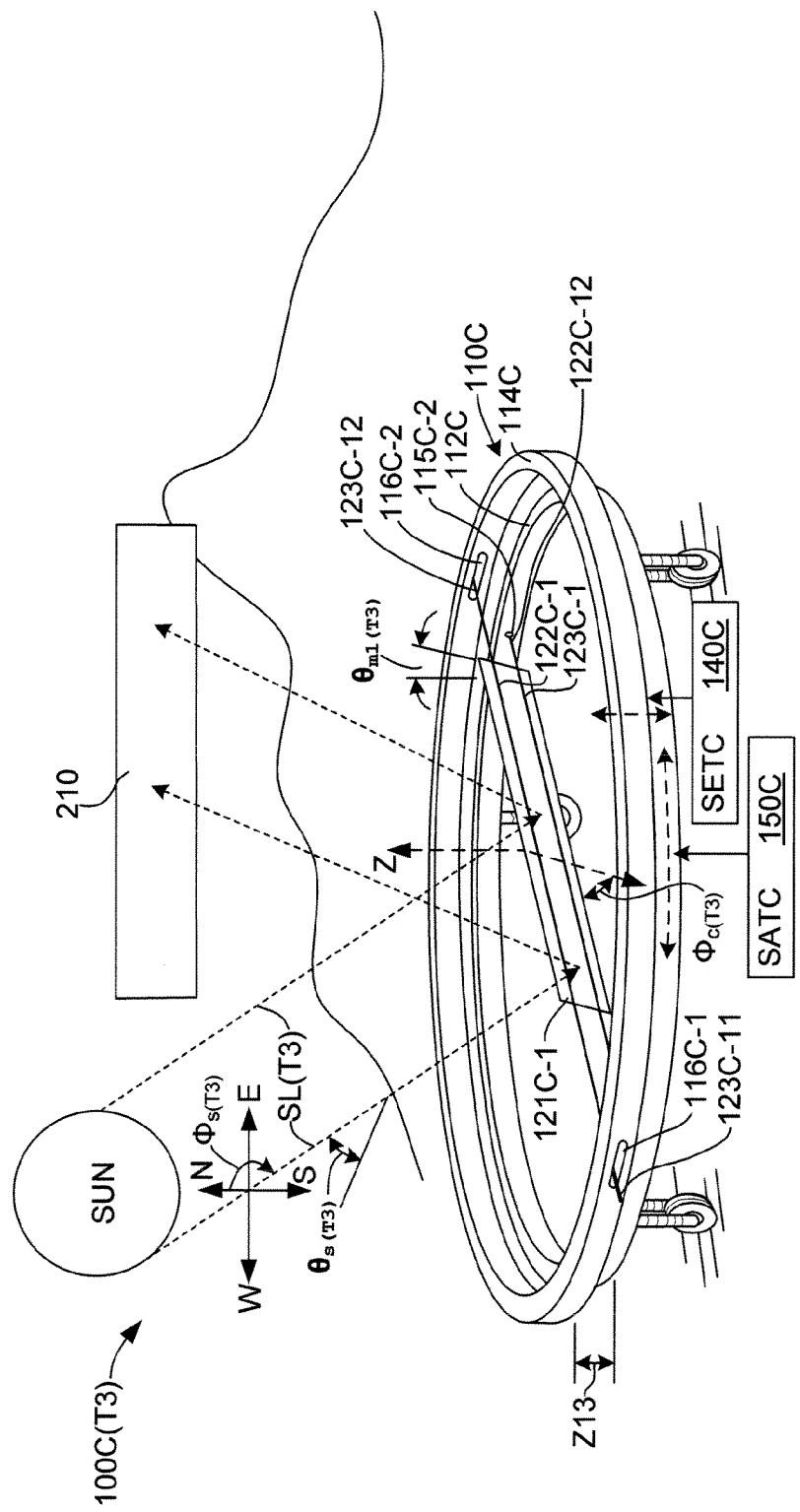

FIGS. 6(A) to 6(C) are top side perspective views showing a simplified heliostat 100C according to another embodiment of the present invention including a carousel 110C in which a mirror 121C-1 is attached to a curved (e.g., ring or cylindrical) peripheral wall 112C and a curved (e.g., ring or cylindrical) tilt-mechanism wall (moveable member) 114C using a concentric ring-type louver arrangement described above with reference to FIG. 2. Tilt-mechanism wall 114C defines slots 116C-1 and 116C-2, and is movably connected to peripheral wall 112C such that tilt-mechanism wall 114C is capable of concentric movement (i.e., vertical movement in the direction of center axis Z while maintaining a parallel orientation) relative to peripheral wall 112C in response to tilt control forces applied under the control of solar elevation tracking controller (SETC) 140C (as indicated by the two-headed dashed-line arrow). Mirror 121C-1 is rotatably connected to peripheral wall 112C by a first rod 122C-1, and is slidably connected to tilt-mechanism wall 114C by a second rod 123C-1. Specifically, opposing ends 122C-11 and 122C-12 of rod 122C-1 are respectively rotatably connected by rotatable bearing structure 115C-1 and 115C-2 to corresponding opposing portions of peripheral wall 112C, and opposing ends 123C-11 and 123C-12 of rod 123C-1 are respectively slidably engaged in slots 116C-1 and 116C-2. This arrangement facilitates louver-type tilt angle control of mirror 121C-1 similar to that described above with reference to FIGS. 2-3(B) by way of vertical (upward/downward) movement of tilt-mechanism wall 114C relative to peripheral wall 112C. Note that only one mirror 121C-1 is shown in FIGS. 6(A) to 6(C) for explanatory purposes—in practical embodiments, multiple mirrors arranged in a mirror array similar to that shown in FIG. 1 would be utilized.

FIGS. 6(A) to 6(C) also illustrate the operation of heliostat 100C during the course of a typical day, and in particular show the rotational and tilt adjustment of mirror 121C-1 in response to the simultaneous operation of both solar azimuth tracking controller (SATC) 150C and SETC 140C to maintain sunlight reflected from mirror 121C-1 on solar receiver 210.

FIG. 6(A) shows heliostat 100C(T1) (i.e., heliostat 100C at dawn) at the beginning of daylight hours when the sun is positioned such that the azimuth angle $\phi_{s(T1)}$ of sunlight rays SL(T1) is directed in a generally northeast-to-southwest direction and the sun's elevation angle $\phi_{s(T1)}$ is relatively shallow due to the sun's low position on the horizon. In accordance with the present embodiment, at time T1, solar azimuth tracking controller 150C positions carousel 110C in a first rotational position $\phi_{c(T1)}$ such that sunlight rays SL(T1) are reflected by mirror 121C-1 at the correct lateral angle onto receiver 210, and solar elevation tracking controller 140C positions tilt-mechanism wall 114C at a first vertical distance Z11 relative to peripheral wall 112C to adjust mirror 121C-1 into a first tilt angle $\theta_{m1(T1)}$ such that sunlight rays SL(T1) are reflected the required elevation angle onto receiver 210.

FIG. 6(B) shows heliostat 100C(T2) (e.g., heliostat 100C at noon) when the sun is positioned such that the azimuth angle $\phi_{s(T2)}$ of sunlight rays SL(T2) is directed in a generally north-to-south direction and the sun's elevation angle $\theta_{s(T2)}$ is at its highest point. In accordance with the present invention, between times T1 and T2, solar azimuth tracking controller 150C causes carousel 110C to gradually or continuously rotate around axis Z such that sunlight rays remain directed by mirror 121C-1 onto receiver 210, whereby at time T2, solar azimuth tracking controller 150C positions base support 130 in at rotational position $\phi_{c(T2)}$. Simultaneously, between times T1 and T2, solar elevation tracking controller 140C causes tilt-mechanism wall 114C to gradually move downward relative to peripheral wall 112C, causing opposing ends 123C-11 and 123C-12 of rod 123C-1 to respectively slide backward along slots 116C-1 and 116C-2, which in turn causes opposing ends 122C-11 and 122C-12 of rod 122C-1 to rotate by way of bearing structure 115C-1 and 115C-2, whereby mirror 121C-1 gradually tilts back such that the sunlight rays remain accurately reflected onto raised solar receiver 210 until, at time T2, solar elevation tracking controller 140C positions tilt-mechanism wall 114C at a second vertical distance Z12 relative to peripheral wall 112C to adjust mirror 121C-1 into a second tilt angle $\theta_{m1(T2)}$ such that sunlight rays SL(T2) are reflected the required elevation angle onto receiver 210.

FIG. 6(C) shows heliostat 100C(T3) (e.g., heliostat 100C in the evening) when the sun is positioned such that the azimuth angle $\phi_{s(T3)}$ of sunlight rays SL(T3) is directed in a generally northwest-to-southeast direction and the sun's elevation angle $\theta_{s(T3)}$ has again dropped to a lower point. In accordance with the present invention, between times T2 and T3, solar azimuth tracking controller 150C causes carousel 110C to gradually rotate around axis Z such that sunlight rays remain directed by mirror 121C-1 onto receiver 210, whereby at time T3, solar azimuth tracking controller 150C positions base support 130 in at rotational position $\phi_{c(T2)}$. Simultaneously, solar elevation tracking controller 140C causes tilt-mechanism wall 114C to gradually move upward relative to peripheral wall 112C, causing opposing ends 123C-11 and 123C-12 of rod 123C-1 to respectively slide forward along slots 116C-1 and 116C-2, which in turn causes opposing ends 122C-11 and 122C-12 of rod 122C-1 to rotate by way of bearing structure 115C-1 and 115C-2, whereby mirror 121C-1 gradually tilts upward such that the sunlight rays remain accurately reflected onto raised solar receiver 210 until, at time T3, solar elevation tracking controller 140C positions tilt-mechanism wall 114C at a third vertical distance Z13 relative to peripheral wall 112C to adjust mirror 121C-1 into a third tilt angle $\theta_{m1(T3)}$ such that sunlight rays SL(T3) are reflected the required elevation angle onto receiver 210.

As set forth in the description above, by forming curved peripheral wall 112C and curved tilt-mechanism wall 114C with concentric circular shapes, the resulting substantially round shape of carousel 110C allows arranging multiple heliostats 100C in a closely spaced relationship, thereby facilitating a much higher ground coverage ratio than that achievable using conventional upright-mirror heliostats. Moreover, the circular shape of peripheral wall 112C and tilt-mechanism wall 114C facilitates operating both structures from a single location because the circular walls remain a substantially fixed distance from mirror positioning system 130C for all rotational positions $\phi_c$ of the carousel 110C. Further, by combining this concentric arrangement with louver-type tilt mechanism, carousel 110C facilitates simultaneous tilting of multiple elongated mirrors with one actuation (e.g., as described below with reference to FIGS. 7-12).

Figure 7A:
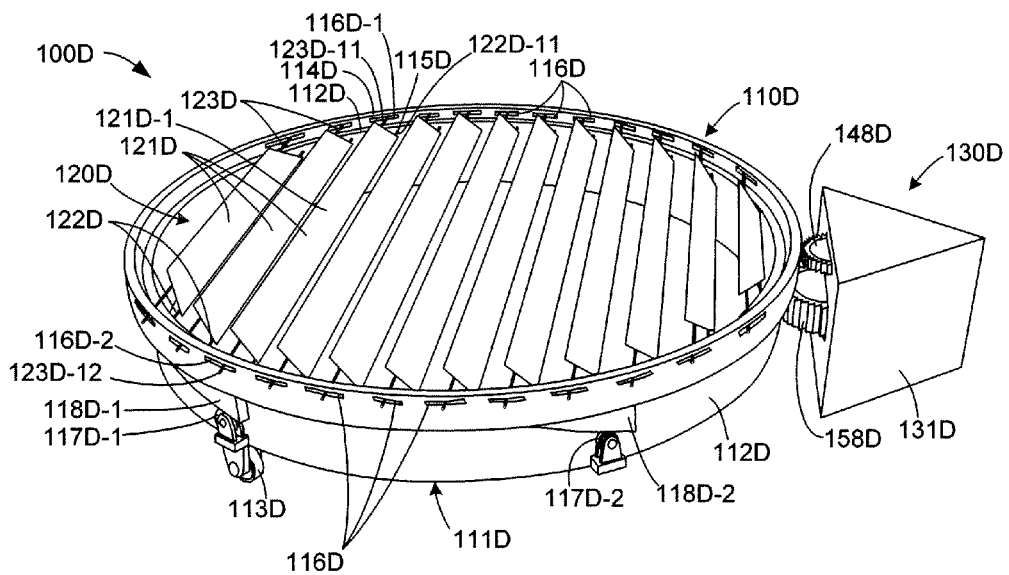
FIGS. 7(A) and 7(B) are top perspective and top plan views, respectively, showing a concentric ring-type heliostat according to a specific embodiment of the present invention.
Figure 7B:
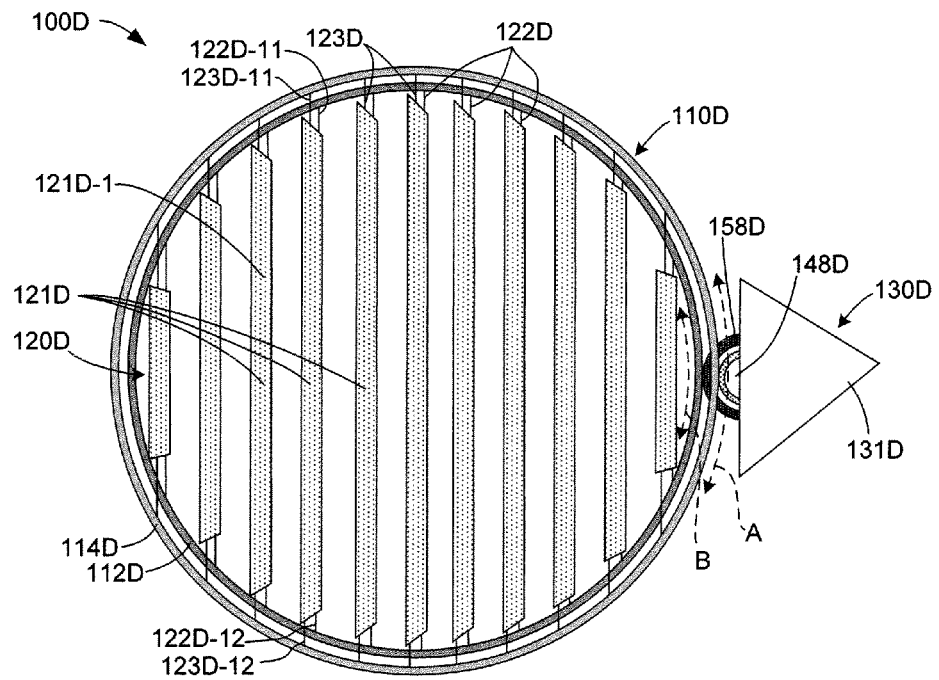

FIGS. 7(A) and 7(B) are top perspective and top plan views, respectively, showing a circular (round) heliostat 100D according to a first specific embodiment of the present invention. Heliostat 100D generally includes a carousel 110D and a mirror positioning system 130D that is fixedly disposed on the ground next to carousel 110D.

Carousel 110D includes a base 111D including a cylindrical (curved) peripheral wall 112D that is rotatable around a central axis by way of multiple (e.g., three) wheels 113D, a mirror array 120D disposed inside peripheral wall 112D, and a ring-shaped tilt-mechanism wall (moveable member) 114D that is concentrically disposed and movably connected to an upper edge of peripheral wall 112D. Mirror array 120D includes multiple elongated flat mirrors 121D that are disposed in a parallel low-profile arrangement. Each mirror 121D (e.g., mirror 121D-1) is attached to peripheral wall 112D and tilt-mechanism wall 114D by way of a louver-type arrangement similar to that described above with reference to FIGS. 6(A) to 6(C). For example, mirror 121D-1 is rotatably connected to peripheral wall 112D by a first rod 122D-1 and slidably connected to tilt-mechanism wall 114D by a second rod 123D-1, where opposing ends 122D-11 and 122D-12 of rod 122D-1 are connected to peripheral wall 112D by rotatable bearing structures 115D, and opposing ends 123D-11 and 123D-12 of rod 123D-1 are respectively slidably engaged in slots 116D-1 and 116D-2. Each of the remaining mirrors 121D are attached in a similar fashion. Similar to the arrangement described above, the louver-type tilt adjustment of mirrors 121D is performed by raising and lowering tilt-mechanism wall 114D relative to peripheral wall 112D.

According to an aspect of the present embodiment, carousel 110D is constructed such that the relative movement (i.e., upward or downward) of tilt-mechanism wall 114D relative to peripheral wall 112D is generated by rotation of tilt-mechanism wall 114D relative to peripheral wall 112D, and mirror positioning system 130D is constructed to perform independent rotation of tilt-mechanism wall 114D and peripheral wall 112D. In the disclosed embodiment (which is intended to be exemplary and not limiting unless specified), carousel 110D includes multiple rollers 117D that are fixedly connected to an outside surface of peripheral wall 112D, and circular tilt-mechanism wall 114D is supported on ramp-like wedge structures 118D that are fixedly connected to an outside surface of tilt-mechanism wall 114D. Mirror positioning system 130D is disposed inside a box (housing) 131D, and includes a first drive wheel/gear 148D that extends through an opening in box 131D to operably contacts an external surface of tilt-mechanism wall 114D, and a second drive wheel/gear 158D that operably contacts an external surface of peripheral wall 112D. Referring to FIG. 7(B), arrow A indicates the rotation of tilt-mechanism wall 114D in accordance with a radial force generated by drive wheel/gear 148D, and arrow B indicates the rotation of peripheral wall 112D in accordance with a radial force generated by drive wheel/gear 158D. Note that if the rotational speed and direction of peripheral wall 112D and tilt-mechanism wall 114D are equal, then the tilt angles of mirrors 121D are not changed when carousel 110D rotates around its central axis. However, if the rotational speed or direction of peripheral wall 112D and tilt-mechanism wall 114D are different, then the tilt angles of mirrors 121D are changed.

Figure 8A:
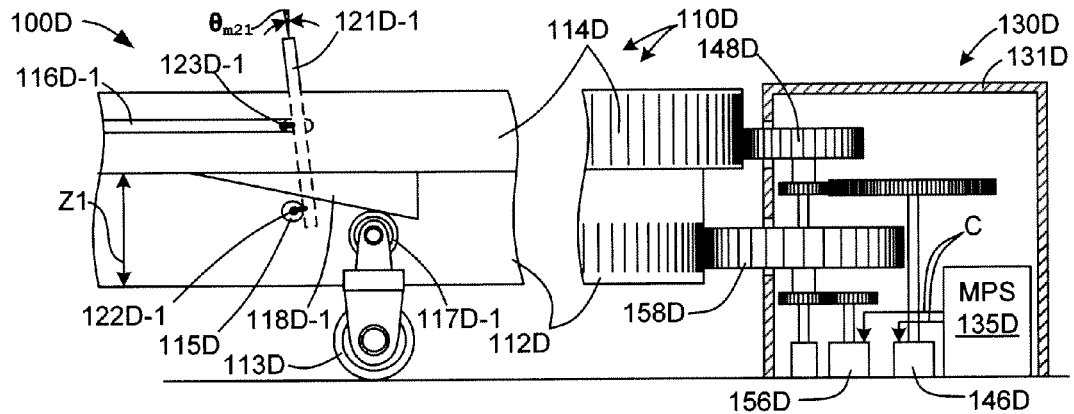
FIGS. 8(A), 8(B) and 8(C) are simplified elevation side views showing the heliostat of FIG. 7(A) during an exemplary mirror tilt adjustment operation.
Figure 8B:
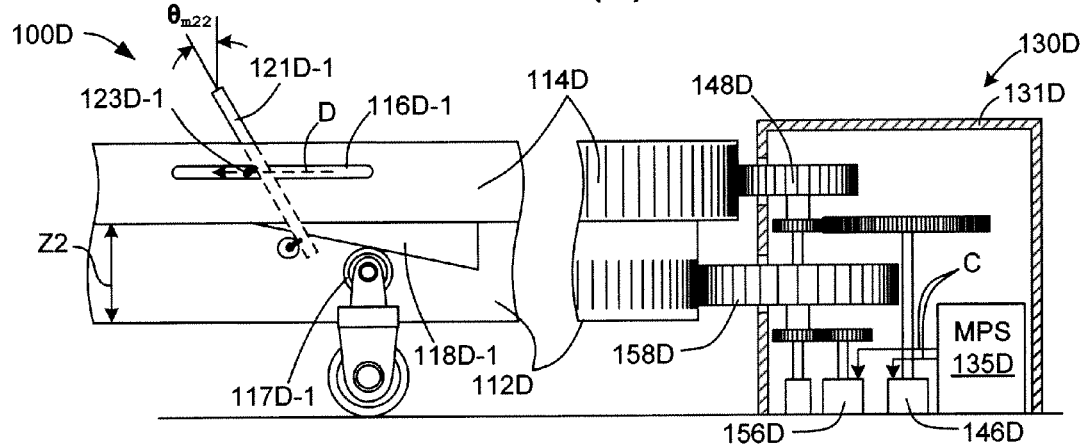
Figure 8C:
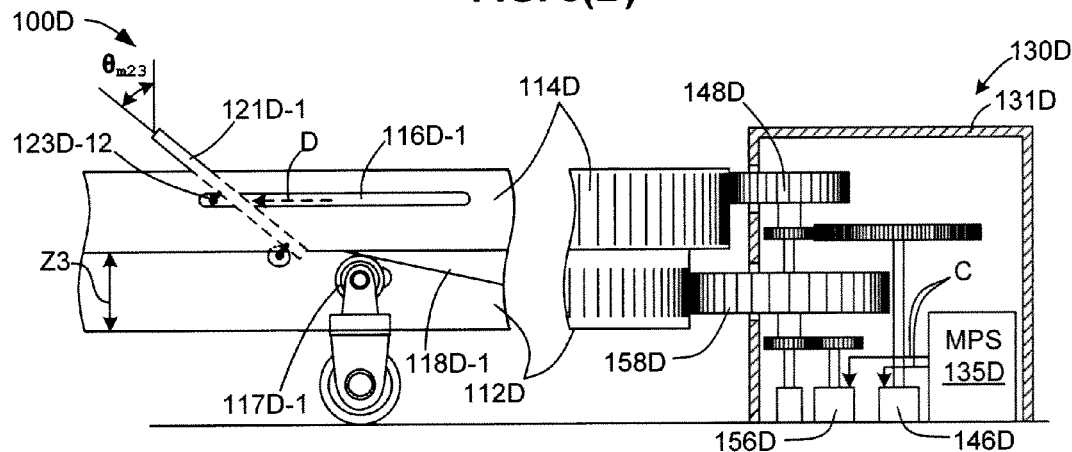

FIGS. 8(A)-8(C) are partial elevation side views showing a portion of heliostat 100D during an exemplary mirror tilt operation. In particular, FIGS. 8(A)-8(C) show a first section of carousel 110D that is contacted by drive wheels/gears 158D and 148D, and a second section of carousel 110D that includes mirror 121D-1, roller 117D-1 and ramp-like wedge structure 118D-1. Mirror positioning system 130D includes a mirror positioning system (MPS) controller 135D disposed inside box 131D along with a (first) rotation control motor 156D and a (second) elevation control motor 146D, which are operably connected to drive wheels/gears 158D and 148D by associated gear trains, respectively. MPS controller 135D generates control signals C consistent with those described above that cause one or both motors 156D and 148D to rotate drive wheels/gears 158D and/or 148D, whereby peripheral wall 112D and tilt-mechanism wall 114D are concentrically rotated in a manner similar to that described above.

FIG. 8(A) shows heliostat 100D in a first position (e.g., when the sun's elevation angle is relatively shallow) in which the relative rotational positions of tilt-mechanism wall 114D and peripheral wall 112D are set by drive wheels/gears 158D and 148D such that mirror 121D-1 is in a substantially upright tilt angle $\theta_{m21}$. In particular, tilt-mechanism wall 114D is rotated relative to peripheral wall 112D such that roller 117D-1 is located at a lower end of ramp-like wedge structure 118D-1, which causes tilt-mechanism wall 114D to have a height Z1 relative to peripheral wall 112D, which in turn causes rod 123D-1 to slide along slot 116D-1 such that mirror 121D-1 pivots around bearing 115D/rod 121D-1 into tilt angle $\theta_{m21}$.

FIG. 8(B) shows heliostat 100D in a second position (e.g., at midmorning when the sun's elevation angle is between sunrise and its zenith) in which the relative rotational positions of tilt-mechanism wall 114D and peripheral wall 112D are set such that mirror 121D-1 is in a partially inclined tilt angle $\theta_{m22}$. To adjust mirror 121D-1 from upright tilt angle $\theta_{m21}$ to partially inclined tilt angle $\theta_{m22}$, drive wheels/gears 158D and 148D are respectively driven by motors 156D and 146D in accordance with control signals C such that tilt-mechanism wall 114D rotates a predetermined angular distance (e.g., as indicated by the arrow D) relative to peripheral wall 112D. This relative rotation causes roller 117D-1 to roll to a central point along ramp-like wedge structure 118D-1, which causes tilt-mechanism wall 114D to move concentrically downward relative to peripheral wall 112D to height Z2, which in turn causes rod 123D-1 to slide along slot 116D-1 such that mirror 121D-1 pivots downward into tilt angle $\theta_{m22}$.

FIG. 8(C) shows heliostat 100D in a third position (e.g., at noon when the sun's elevation angle is at its zenith) in which the relative rotational positions of tilt-mechanism wall 114D and peripheral wall 112D are set such that mirror 121D-1 is in a fully inclined tilt angle $\theta_{m23}$. To adjust mirror 121D-1 from partially inclined tilt angle $\theta_{m22}$ to fully inclined tilt angle $\theta_{m23}$, drive wheels/gears 158D and 148D are respectively driven such that tilt-mechanism wall 114D rotates a further predetermined angular distance relative to peripheral wall 112D, whereby roller 117D-1 rolls further along ramp-like wedge structure 118D-1 to its uppermost end, which causes tilt-mechanism wall 114D to move further concentrically downward relative to peripheral wall 112D to height Z3, which in turn causes rod 123D-1 to slide along slot 116D-1 such that mirror 121D-1 pivots downward into tilt angle $\theta_{m23}$.

Heliostat 100D facilitates both carousel rotation and mirror tilt-angle control using only two motors (e.g., motors 156D and 146D, see FIG. 8(A)) that respectively engage tilt-mechanism wall 114D and peripheral wall 112D by way of respective gear trains housed in a single motor box 131D.

Figure 9A:
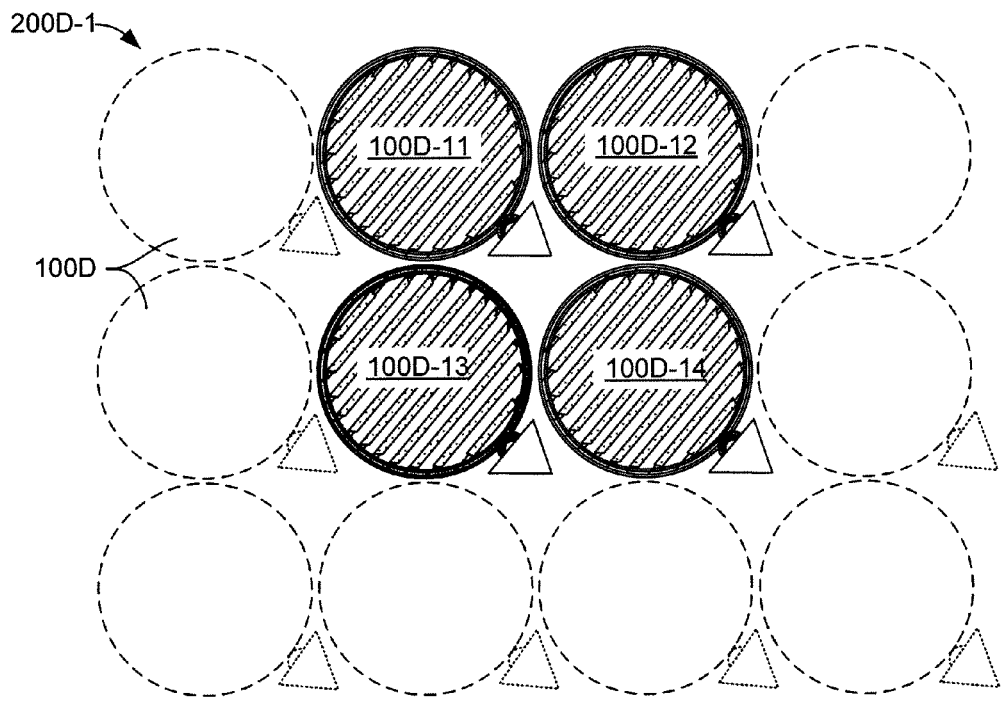
FIGS. 9(A) and 9(B) are simplified top plan views showing alternative high fill-factor spacing arrangements including multiple concentric ring-type heliostats of FIG. 7(A) according to a specific embodiment of the present invention.
Figure 9B:
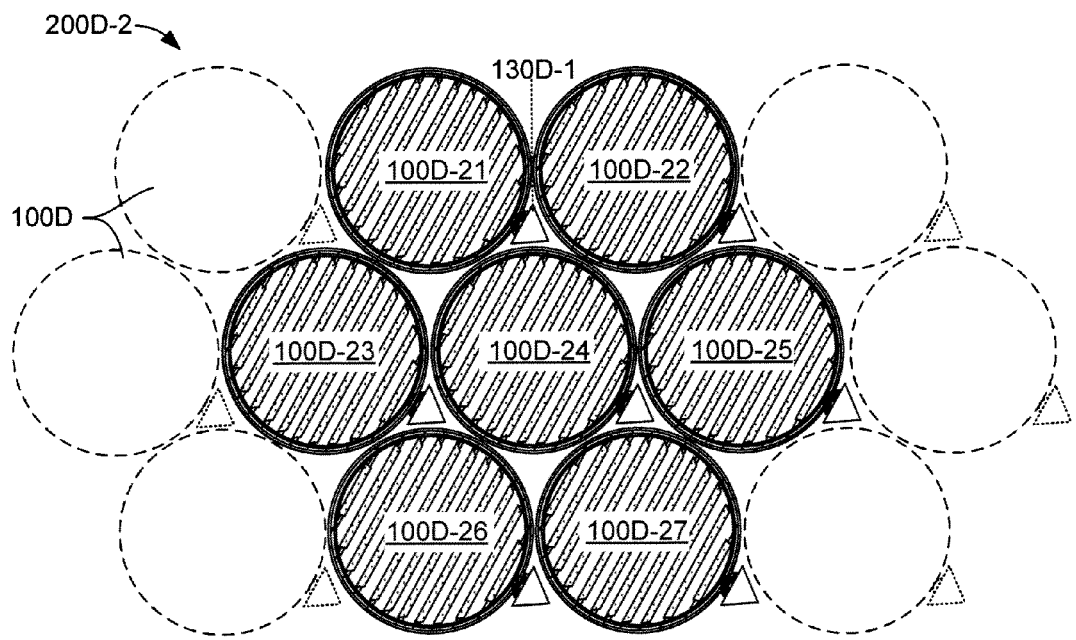

Moreover, the circular carousel shape and single motor box arrangement of heliostat 100D facilitates heliostat arrays in which multiple heliostats 100D are disposed in closely spaced arrangements, thereby facilitating a much higher ground coverage ratio than that achievable using conventional upright-mirror heliostats. For example, FIG. 9(A) shows a portion of a solar tower system 200D-1 in which an array of heliostats 100D are arranged in a square pattern (as indicated by heliostats 100D-11 to 100D-14). Even higher ground coverage ratios are achieved by arranging the circular heliostats in a hexagonal arrangement, such as that shown by solar tower system 200D-2 in FIG. 9(B), where an exemplary hexagonal pattern is indicated by heliostats 100D-21 to 100D-27). Note that, with either arrangement, space is provided between adjacent round carousels for the required motor box (e.g. motor box 130D-1 is shown located in the substantially triangular space between the carousels of heliostats 100D-21, 100D-22 and 100D-24 in FIG. 9(B)).

Figure 10A:
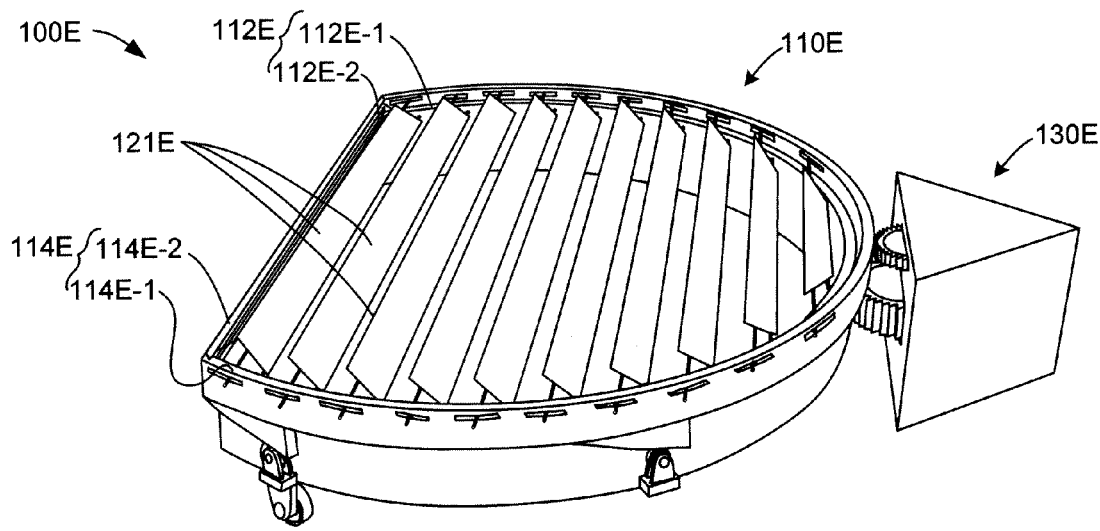
FIGS. 10(A) and 10(B) are simplified top perspective and top plan views, respectively, showing a D-shaped heliostat according to a specific embodiment of the present invention.
Figure 10B:
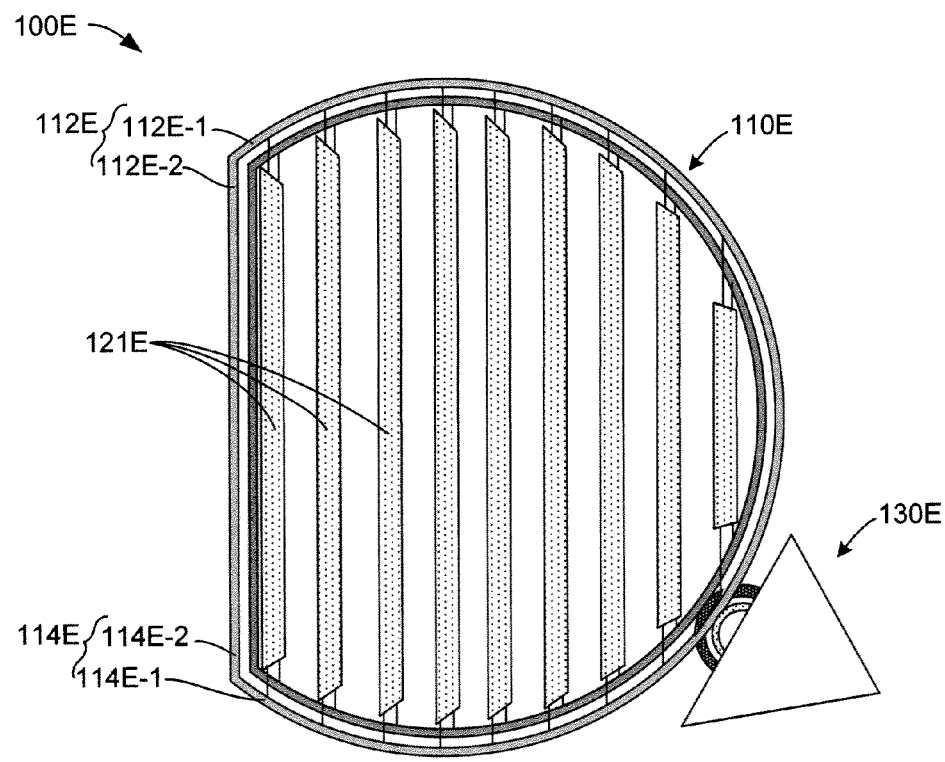

FIGS. 10(A) and 10(B) are top perspective and top plan views, respectively, showing a D-shaped heliostat 100E according to a second specific embodiment of the present invention. Heliostat 100E generally includes a carousel 110E, mirrors 121E and a mirror positioning system 130E that are essentially identical to and operate the same as those of round heliostat 100D (described above with reference to FIGS. 7(A) to 8(C), and thus a detailed description of these essentially identical structures is omitted as redundant.

Carousel 110E differs from round carousel 110D in that peripheral wall 112E and a tilt-mechanism wall 114E are formed by concentric D-shaped (e.g., truncated cylinder or cut-off circular) structures. That is, peripheral wall 112E includes a truncated cylindrical wall portion 112E-1 and a straight wall portion 112E-2 connecting edges of the truncated cylindrical wall portion 112E-1, and tilt-mechanism wall 114E-1 includes a curved wall portion 114E-1 and a straight wall portion 114E-2 connecting edges of the curved wall portion 114E-1. The main advantage of this D-shaped structure is described below with reference to FIGS. 11 and 12.

Figure 11:
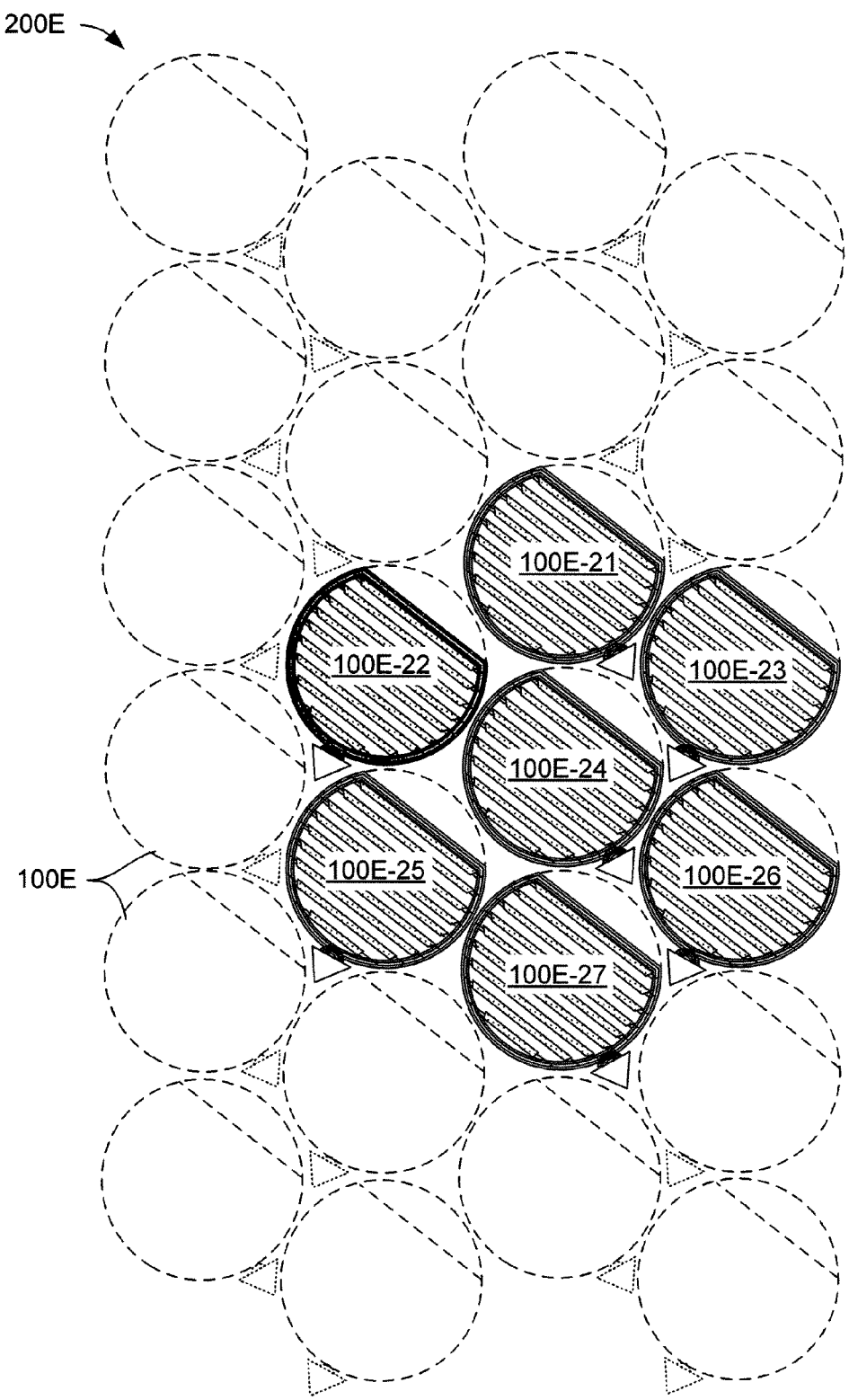
FIG. 11 is a simplified top perspective view showing several D-shaped heliostats in a high fill-factor spacing arrangement according to an embodiment of the present invention.

FIG. 11 shows a solar tower system 200E during operation, where an array of D-shaped heliostats 100E are arranged in a tight hexagonal pattern (indicated by heliostats 100E-21 to 100E-27) similar to that described above with reference to FIG. 9(B), and all heliostats are turned to reflect sunlight onto a solar receiver (not shown). By defining a space for each heliostat 100E based on a full-circle area swept out by its carousel (indicated by the circular dashed line on each heliostat 100E), all heliostats 100E are able to rotate into any required solar reflecting position, and are also fully rotatable to facilitate maintenance in the manner described above.

Figure 12:
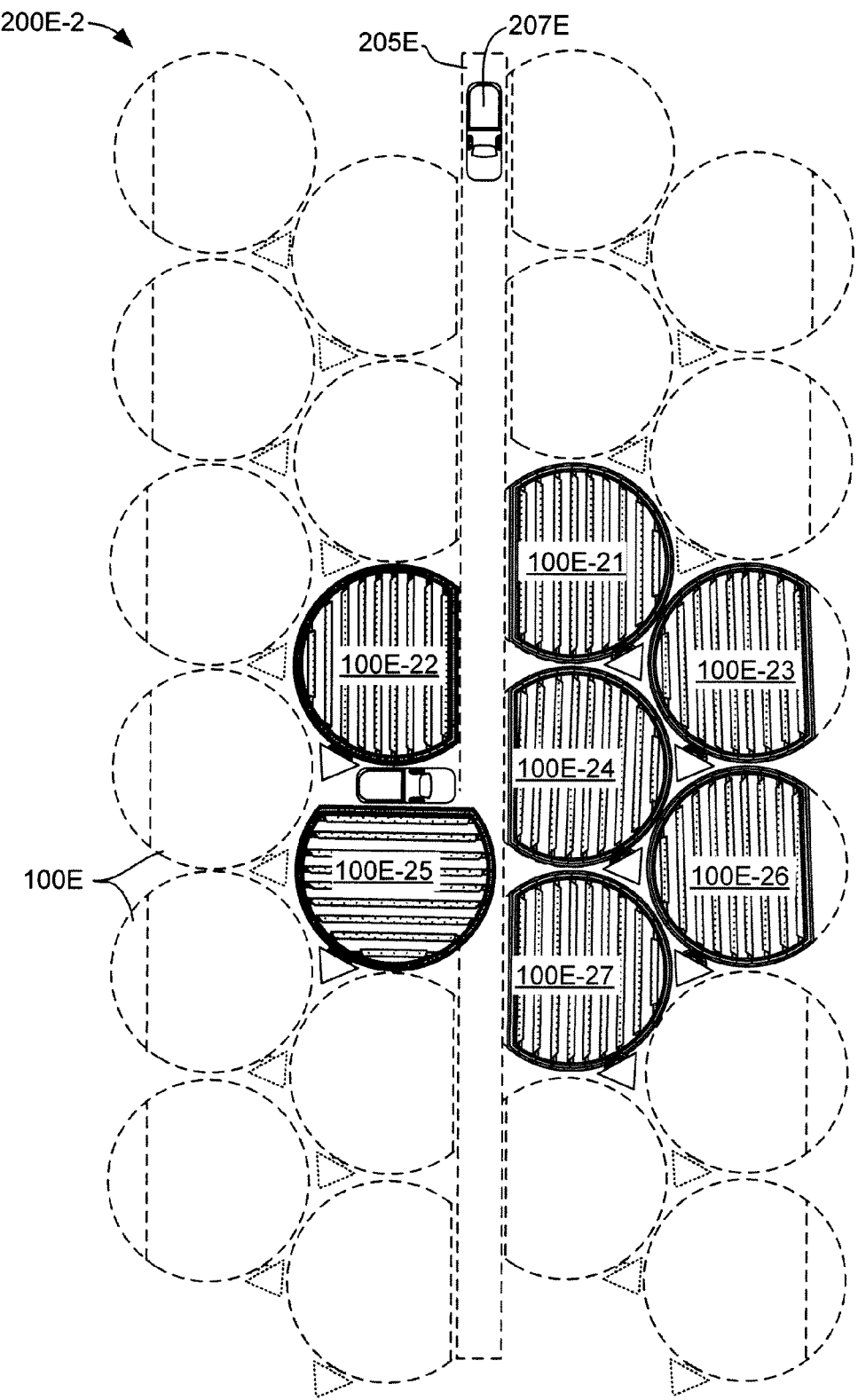
FIG. 12 is a simplified top plan view showing multiple D-shaped heliostats in the high fill-factor spacing arrangement of FIG. 11 when aligned for maintenance.

FIG. 12 shows a solar tower system 200E during an exemplary maintenance cycle, where the main benefit of D-shaped carousel 100E is fully appreciated. That is, although the D-shape of carousels 110E carries a slightly reduced mirror area (and, hence, reflect less sunlight) than full circular carousel 110D (described above), the fl-shape facilitates the formation of service pathways 205E by aligning the flat side walls of all heliostats disposed in an array, as indicated in FIG. 12, thereby facilitating access to any heliostat (e.g., heliostat 100E-25), e.g. by way of a service vehicle 207E (for sufficiently large diameters) or on foot (for smaller heliostats of smaller diameter). That is, the full circular footprint of heliostats 100D may achieve a maximum ground coverage ratio, but maintenance of round heliostats located in the center of an array may be problematic unless sufficient space is provided between adjacent carousels, thus reducing the array's practical ground coverage ratio. The present inventors believe that the D-shaped footprint of heliostats 100E, when arranged in the hexagonal pattern shown in FIGS. 11 and 12 and optimized to facilitate pathways 205E for service vehicles 207E with minimal clearance, provides a practical ground coverage ratio (defined as the ground coverage ratio realized after leaving room for maintenance access) that is greater than that achieved using round heliostats.

Figure 13A:
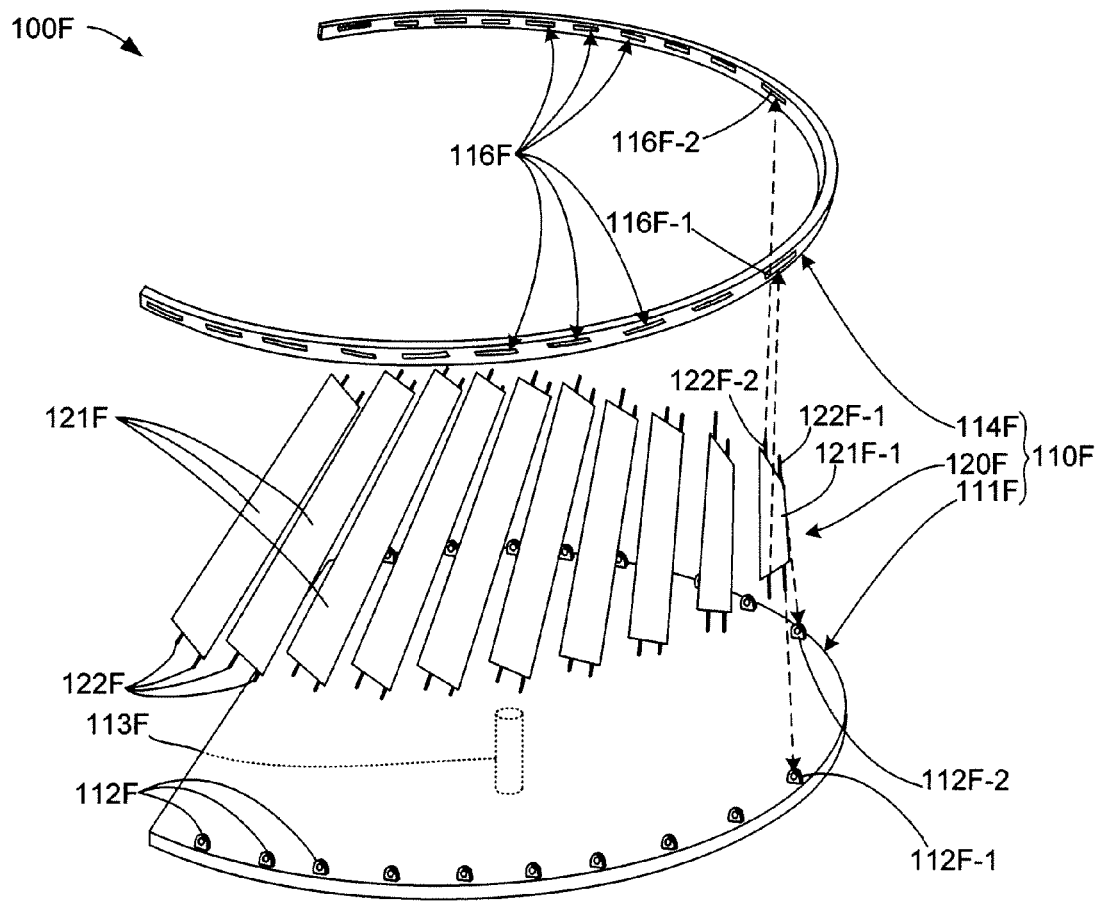
FIGS. 13(A) and 13(B) are simplified top exploded perspective and assembled perspective views showing the carousel of a D-shaped heliostat according to another embodiment of the present invention.
Figure 13B:
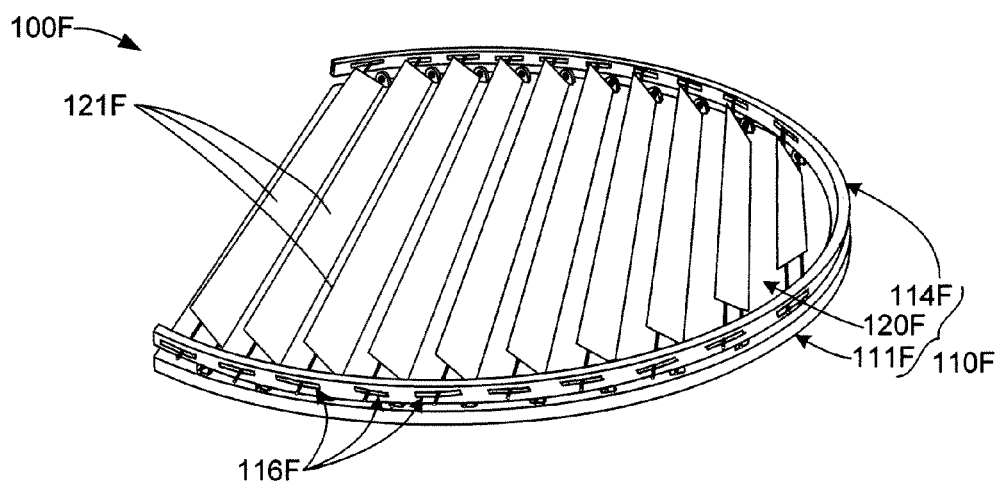

FIGS. 13(A) and 13(B) show a D-shaped heliostat 100F according to another embodiment of the present invention. As mentioned above, benefits of the present invention may be achieved using a carousel that omits a peripheral wall, although this would reduce the potential windload preventing benefits that are mentioned above. Carousel 110F generally includes a D-shaped base 111F, a C-shaped tilt-angle control mechanism 114F, and a mirror array 120F. D-shaped base 111F is a substantially flat plate-like structure that includes multiple mounts (peripheral edge structures) 112F disposed along a peripheral edge thereof. D-shaped base 111F is rotatably (movably) disposed on a support surface by way of a central post 113F and associated roller bearings such that rotation of base 111F around a central axis defined by post 113F causes peripheral edge structures 112F to rotate as a unit around the central axis. C-shaped tilt-angle control mechanism 114F defines multiple slots 116F similar to those described above, and is positioned over the curved peripheral portion of D-shaped base 111F. Mirror array 120F includes multiple elongated flat mirrors 121F that are mounted on parallel rods 122F. As indicated in FIG. 13(A), each mirror 121F is attached by way of one rod 121F to corresponding peripheral edge structures 112F and by the other rod 121F to corresponding slots 116F of tilt-angle control mechanism 114F. For example, as indicated by the dashed line arrows at on the right side of FIG. 13(A), mirror 121F-1 is connected by way of rod 121F-1 to peripheral edge structures 112F-1 and 112F-2, and by way of rod 121F-2 to slots 116F-1 and 116F-2. As indicated in FIG. 13(B), when operably assembled, mirror array 120F is maintained in a low-profile, substantially horizontal plane. Base 111F and mirrors 121F are rotated/tilted in accordance with a given sun position by way of a mirror positioning system (not shown) in a manner similar to that described above.

Figure 14:
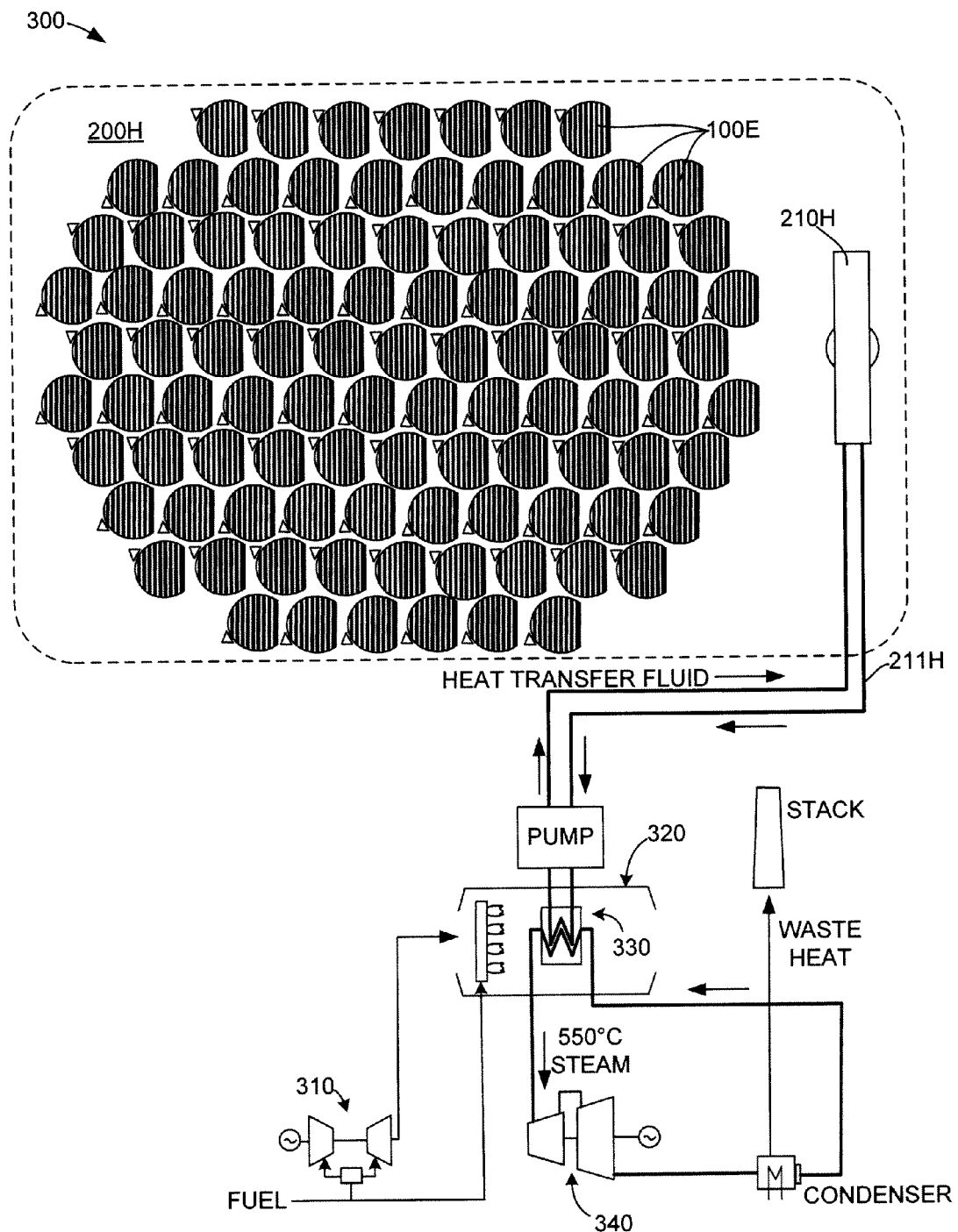
FIG. 14 is a simplified top plan view showing a solar tower system including according to another alternative specific embodiment of the present invention.

FIG. 14 is a simplified diagram showing a co-generation power plant 300 utilizing both a solar tower system 200H produced according to any of the embodiments described above, and a conventional natural gas heat generator 310 to generate steam in a conventional steam production facility 320 for driving a steam turbine 340. In accordance with this embodiment of the present invention, solar tower system 200H includes an array of heliostats 100 disposed in an area next to steam production facility 320, and a heat-exchange-type solar receiver 210H having a conduit 211H containing a heat transfer fluid that is heated by the sunlight concentrated by heliostats 100 in the manner described above. The heated transfer fluid is then transferred by conduit 211H to a heat exchanger 330 disposed inside steam production facility 320. Steam production facility 320 is configured to utilize both solar tower system 200F and natural gas heat generator 310 to generate super-heated steam at 550° C. that drives steam turbine 340, thus generating electricity. During bright sunny days, sufficient heat is generated by solar tower system 200H such that 550° C. steam is generated is generated by steam generator 320 without assistance from natural gas heat generator 310. At night (or on cloudy days when solar energy is insufficient to achieve steam at 550° C.), natural gas heat generator 310 is implemented to generate the desired steam temperature, possibly in conjunction with or replaced by a heat storage facility. The solar tower systems of the present invention are ideally suited for use in such co-generation power plant arrangements because they combine a clear set of upfront costs, low land use, low maintenance costs, and highly reliable performance expectations.

Although the present invention has been described with respect to certain specific embodiments, it will be clear to those skilled in the art that the inventive features of the present invention may be implemented using analogous but mechanically different embodiments, all of which are intended to fall within the scope of the present invention. In addition, the description of the present invention has been simplified to highlight relevant novel features, with related structural features (e.g., stiffening braces inside the peripheral wall to reduce material thickness requirements) omitted for brevity. It is further noted that the heliostat arrangement may be modified, for example, such that a single motor box is used to drive three neighboring carousels. In this case, a single gear/wheel may be used to drive all three neighboring carousels, but a currently preferred arrangement would use a driven gear/wheel to drive one carousel, and undriven rollers to drive the other two carousels.

It should also be noted that the provided heliostats are given without a limiting reference to a specific size scale. The benefits of what is taught here may apply to devices ranging throughout a wide range of sizes (diameters), as will be appreciated by those skilled in the art. Progressing to smaller sized heliostats, the structural efforts (mechanical loads, costs) will typically decrease, while at the same time the cost for assembly, electronics modules, actuators, etc., will increase due to the higher part count. However, the higher number of smaller sized heliostats has the potential to harness improved economies of scale in production. Those skilled in the art will appreciate, that based on those and similar arguments, an optimum size scale will be found, depending on the circumstances, geography and year of construction.

The invention claimed is:

1. A heliostat for reflecting sunlight onto a solar receiver of a solar tower system, the heliostat comprising:
 a carousel including:
  a D-shaped base, as viewed from above, including a D-shaped, as viewed from above, peripheral edge structure forming a first curved wall surrounding a central region, the D-shaped base being movably disposed on a support surface such that the peripheral edge structure is rotatable around a central axis located in the central region, a tilt-angle control mechanism comprising a second curved wall concentrically disposed and rotatably supported by the first curved wall such that the second curved wall is capable of rotational and vertical movement with respect to the first curved wall, and a mirror array including a plurality of substantially parallel, elongated flat mirrors arranged in a low-profile, substantially horizontal plane and disposed in the central region, each elongated flat mirror being movably connected to the first curved wall and the second curved wall such that said each elongated flat mirror is maintained in a corresponding tilt angle; and a mirror positioning system fixedly disposed adjacent to the D-shaped base of the carousel, the mirror positioning system including:

a solar elevation tracking controller including means operably connected to the second curved wall for adjusting the tilt angle of each of the plurality of elongated flat mirrors in accordance with a determined sun elevation angle such that sunlight directed onto the mirror array from said determined sun elevation angle is reflected by all of the plurality of elongated flat mirrors onto the solar receiver, and a solar azimuth tracking controller including means for adjusting the rotational position of the mirror array around the central axis in accordance with a determined sun azimuth angle such that sunlight directed onto the mirror array along said determined sun azimuth angle is reflected by all of the plurality of elongated flat mirrors onto the solar receiver of the solar tower system.

2. The heliostat according to claim 1, wherein the second curved wall defines a plurality of slots, and wherein each elongated flat mirror of the plurality of elongated flat mirrors is connected to a first rod and a second rod, the first rod being that is rotatably connected to the first curved wall, and the second rod being slidably engaged in a corresponding slot of said plurality of slots such that movement of the second curved wall in a first direction relative to the first curved wall causes the corresponding tilt angle of said each elongated flat mirror to decrease, and such that movement of the second curved wall in a second direction relative to the first curved wall causes the corresponding tilt angle of said each elongated flat mirror to increase.

3. The heliostat according to claim 2, wherein the elevation tracking controller includes a first motor and associated linkage mechanism for causing said second curved wall to move away from the first curved wall in order to decrease the corresponding tilt angle of said each elongated flat mirror, and for causing said second curved wall to move toward the first curved wall in order to increase the corresponding tilt angle of said each elongated flat mirror.

4. The heliostat according to claim 2, wherein the solar elevation tracking controller comprises:

a device for determining the sun elevation angle, a processor for generating control signals in response to the determined sun elevation angle, and a motor for supplying a positioning force to said second curved wall until the corresponding tilt angle of said each elongated flat mirror causes said each elongated flat mirror to reflect sunlight onto said solar receiver of a solar tower system.

5. The heliostat according to claim 1, wherein said carousel further comprises a passive movable support mechanism disposed between the first curved wall and at least one of the support surface or the mirror array.

6. The heliostat according to claim 5, further comprising a curved guide disposed on the support surface, wherein the movable support mechanism comprises a plurality of support wheels, each support wheel of the plurality of support wheels being engaged with the curved guide such that said each wheel is constrained to move along a path defined by a curved guide.

7. The heliostat according to claim 5, wherein the solar azimuth tracking controller comprises:

a device for determining a sun azimuth angle, a processor for generating a control signal in response to the determined sun azimuth angle, and a motor for supplying a positioning force to said first curved wall such that the carousel rotates by way of said passive movable support mechanism until the corresponding rotational position of the carousel causes said plurality of elongated flat mirror to reflect sunlight onto said solar receiver of a solar tower system.

8. The heliostat according to claim 1, wherein the solar azimuth tracking controller comprises means for supplying a positioning force to said first curved wall such that the carousel is rotated around the central axis into a first said rotational position in accordance with a determined sun azimuth angle, and wherein the elevation tracking controller includes means for causing said second curved wall to move vertically relative to the first curved wall such that each elongated flat mirror is tilted into a first corresponding tilt angle in accordance with ~ the determined sun elevation angle.

9. The heliostat according to claim 8, wherein the curved second wall defines a plurality of slots, and wherein each elongated flat mirror of the plurality of elongated flat mirrors is connected to a first rod and a second rod, the first rod being rotatably connected at each end to the curved first wall, and the second rod being slidably engaged at each end into corresponding slots of said plurality of slots such that concentric movement of the curved second wall in a first direction relative to the curved first wall causes the corresponding tilt angle of said each elongated flat mirror to decrease, and such that concentric movement of the curved second wall in a second direction relative to the curved first wall causes the corresponding tilt angle of said each elongated flat mirror to increase.

10. The heliostat according to claim 8, wherein the peripheral edge structure further comprises a plurality of rollers fixedly secured to the curved first wall, wherein the tilt-mechanism further comprises a plurality of wedge structures disposed on the curved second wall, and wherein the curved second wall is concentrically mounted on the curved first wall such that each wedge structure of the plurality of wedge structures is supported on an associated roller of the plurality of rollers, and such that rotation of the curved second wall relative to the curved first wall around the central axis causes said each roller to roll along said associated wedge, whereby said curved second wall moves in the direction of the central axis relative to the curved first wall.

11. The heliostat according to claim 10,
wherein the solar azimuth tracking controller
comprises a first motor operably coupled to the curved first wall such that force generated by the first motor causes the curved first wall to rotate around the central axis, and
wherein the solar elevation tracking controller comprises a second motor operably coupled to the curved second wall such that force generated by the second motor causes the curved second wall to rotate around the central axis,
whereby controlling said first and second motors such that a rate of rotation of the curved first wall is different from a rate of rotation of said curved second wall causes said each roller to roll along said associated wedge.

12. The heliostat according to claim 10,
wherein the curved second wall defines a plurality of slots, and
wherein each elongated flat mirror of the plurality of elongated flat mirrors is connected to a first rod and a second rod, the first rod being rotatably connected at each end to the curved first wall, and e the second rod being slidably engaged at each end into corresponding slots of said plurality of slots such that concentric movement of the curved second wall in a first direction relative to the curved first wall causes the corresponding tilt angle of said each elongated flat mirror to decrease, and such that concentric movement of the curved second wall in a second direction relative to the curved first wall causes the corresponding tilt angle of said each elongated flat mirror to increase.

13. The heliostat according to claim 12,
wherein each of the curved first wall and the curved second wall comprise one of a D-shaped ring wall
and a truncated cylindrical wall.

14. The heliostat according to claim 8, wherein the curved first wall comprises a truncated cylindrical wall portion and a straight wall portion connecting edges of the truncated cylindrical wall portion, and the curved second wall comprises a curved wall portion and a straight wall portion connecting edges of the curved wall portion.

15. The heliostat according to claim 14,
wherein the curved wall portion defines a plurality of slots, and
wherein each elongated flat mirror of the plurality of elongated flat mirrors is connected to a first rod and a second rod, the first rod being rotatably connected at each end to the truncated cylindrical wall portion, and the second rod being slidably engaged at each end into corresponding slots of said plurality of slots such that concentric movement of the curved second wall in a first direction relative to the curved first wall causes the corresponding tilt angle of said each elongated flat mirror to decrease, and such that concentric movement of the curved second wall in a second direction relative to the curved first wall causes the corresponding tilt angle of said each elongated flat mirror to increase.

16. The heliostat according to claim 14,
wherein the peripheral edge structure further
comprises a plurality of rollers fixedly secured to the curved first wall,
wherein the tilt-mechanism further comprises a plurality of wedge structures disposed on the curved second wall, and
wherein the curved second wall is concentrically mounted on the curved first wall such that each wedge structure of the plurality of wedge structures is supported on an associated roller of the plurality of rollers, and such that rotation of the curved second wall relative to the curved first wall around the central axis causes said each roller to roll along said associated wedge, whereby said curved second wall moves in the direction of the central axis relative to the curved first wall.

17. The heliostat according to claim 14,
wherein the solar azimuth tracking controller
comprises a first motor operably coupled to the curved first wall such that force generated by the first motor causes the curved first wall to rotate around the central axis, and
wherein the solar elevation tracking controller comprises a second motor operably coupled to the curved second wall such that force generated by the second motor causes the curved second wall to rotate around the central axis, whereby controlling said first and second motors such that a rate of rotation of the curved first wall is different from a rate of rotation of said curved second wall causes said each roller to roll along said associated wedge.

18. The heliostat according to claim 8,
wherein the solar azimuth tracking controller
comprises a first motor operably coupled to the curved first wall such that force generated by the first motor causes the curved first wall to rotate around the central axis, and
wherein the solar elevation tracking controller comprises a second motor operably coupled to the curved second wall such that force generated by the second motor causes the curved second wall to rotate around the central axis.

19. A heliostat for reflecting sunlight onto a solar receiver of a solar tower system, the heliostat comprising:
a carousel including:
a D-shaped base, as viewed from above, having a D-shaped, as viewed from above, peripheral edge structures forming a first curved wall, the D-shaped base movably disposed on a support surface such that the first curved wall is rotatable around a central axis,
a tilt-angle control mechanism comprising a second curved wall concentrically disposed and rotatably supported by the first curved wall such that the second curved wall is capable of rotational and vertical movement with respect to the first curved wall, and
a mirror array including a plurality of substantially parallel, elongated flat mirrors arranged in a low-profile, substantially horizontal plane and surrounded by the first curved wall, each elongated flat mirror being movably connected to the first curved wall and to the second curved wall such that said each elongated flat mirror is maintained in a corresponding tilt angle; and
a mirror positioning system fixedly disposed adjacent to the carousel, the mirror positioning system including:
a solar elevation tracking controller including means operably connected to the second curved wall for adjusting the tilt angle of each of the plurality of elongated flat mirrors in accordance with a determined sun elevation angle such that sunlight directed onto the mirror array from said determined sun elevation angle is reflected by all of the plurality of elongated flat mirrors onto the solar receiver, and
a solar azimuth tracking controller including means for adjusting the rotational position of the mirror array around the central axis in accordance with a determined sun azimuth angle such that sunlight directed onto the mirror array along said determined sun azimuth angle is reflected by all of the plurality of elongated flat mirrors onto the solar receiver of the solar tower system.

20. A solar tower system comprising:

a solar receiver fixedly disposed over a support surface;

an array including a plurality of heliostats disposed on the support surface adjacent to the solar receiver, each heliostat including:

a carousel including:

a D-shaped base, as viewed from above, including a D-shaped, as viewed from above, peripheral edge structure forming a first curved wall surrounding a central region, the D-shaped base being movably disposed on the support surface such that the first curved wall is rotatable around a central axis located in the central region, one or more tilt-angle control mechanisms comprising a second curved wall concentrically disposed and rotatably supported by the first curved wall such that the second curved wall is capable of rotational and vertical movement with respect to the first curved wall, and a mirror array including a plurality of substantially parallel, elongated flat mirrors arranged in a low-profile, substantially horizontal plane and disposed in the central region, each elongated flat mirror being movably connected to the first curved wall and the second curved wall such that said each elongated flat mirror is maintained in a corresponding tilt angle; and a mirror positioning system fixedly disposed adjacent to the D-shaped base of the carousel, the mirror positioning system including:

a solar elevation tracking controller including means operably connected to the tilt angle second curved wall for adjusting the tilt angle of each of the plurality of elongated flat mirrors in accordance with a determined sun elevation angle such that sunlight directed onto the mirror array from said determined sun elevation angle is reflected by all of the plurality of elongated flat mirrors onto the solar receiver, and a solar azimuth tracking controller including means for adjusting the rotational position of the mirror array around the central axis in accordance with a determined sun azimuth angle such that sunlight directed onto the mirror array along said determined sun azimuth angle is reflected by all of the plurality of elongated flat mirrors onto the solar receiver of the solar tower system.

* * * * *